(12) United States Patent
Kamo et al.

(10) Patent No.: US 10,711,692 B2
(45) Date of Patent: Jul. 14, 2020

(54) VARIABLE COMPRESSION RATIO MECHANISM

(71) Applicant: TOYOTA JIDOSHA KABUSHIKI KAISHA, Toyota-shi, Aichi-ken (JP)

(72) Inventors: Yoshiro Kamo, Ashigarakami-gun (JP); Akio Kidooka, Ashigarakami-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 148 days.

(21) Appl. No.: 15/915,766

(22) Filed: Mar. 8, 2018

(65) Prior Publication Data

US 2018/0258846 A1  Sep. 13, 2018

(30) Foreign Application Priority Data

Mar. 9, 2017  (JP) .................. 2017-045142

(51) Int. Cl.
| | |
|---|---|
| *F02B 75/04* | (2006.01) |
| *F02D 15/02* | (2006.01) |
| *F16C 7/06* | (2006.01) |
| *F16H 19/00* | (2006.01) |

(52) U.S. Cl.
CPC ............ *F02B 75/045* (2013.01); *F02D 15/02* (2013.01); *F16C 7/06* (2013.01); *F16H 19/001* (2013.01); *F16C 2360/22* (2013.01); *F16H 2019/008* (2013.01)

(58) Field of Classification Search
CPC .......... F02B 75/045; F02D 15/02; F16C 7/06; F16H 2019/008
USPC ....................................... 123/48 B
See application file for complete search history.

(56) References Cited

FOREIGN PATENT DOCUMENTS

| | | | |
|---|---|---|---|
| WO | WO 2016/037696 | 3/2016 | |
| WO | WO-2016037696 A1 * | 3/2016 | ............ F02B 75/045 |

* cited by examiner

*Primary Examiner* — Lindsay M Low
*Assistant Examiner* — Omar Morales
(74) *Attorney, Agent, or Firm* — Finnegan, Henderson, Farabow, Garrett & Dunner, LLP

(57) ABSTRACT

A gear drive mechanism is provided with a gear drive pin provided at the second gear, a first movable member and second movable member configured to be able to move to the gear drive pin side, a first guide groove formed at the first movable member and engaged with the gear drive pin when making the eccentric member rotate toward a low compression ratio position, and a second guide groove formed at the second movable member and engaging with the gear drive pin when making the eccentric member rotate toward the high compression ratio position and wherein the mechanism makes the gear drive pin moving relative to a counterweight move along the first guide groove and the second guide groove so as to make the second gear rotate.

4 Claims, 20 Drawing Sheets

(A)
LOW COMPRESSION RATIO (B)
HIGH COMPRESSION RATIO

VARIABLE COMPRESSION RATIO MECHANISM

CROSS-REFERENCE TO RELATED APPLICATION

This application claims priority based on Japanese Patent Application No. 2017-045142 filed with the Japan Patent Office on Mar. 9, 2017, the entire contents of which are incorporated into the present specification by reference.

TECHNICAL FIELD

The present disclosure relates to an internal combustion engine.

BACKGROUND ART

WO2016/037696A1 discloses as a conventional compression ratio variable mechanism able to change a mechanical compression ratio of an internal combustion engine a mechanism where a small end shaft receiving hole formed at a small end of a connecting rod has inserted into it, to be able to rotate, an eccentric member supporting a piston pin so that an axial center of the piston pin is positioned at a position offset from a center axis of the small end shaft receiving hole by exactly a predetermined amount. According to the constitution of the conventional variable compression ratio mechanism, by making the eccentric member turn within a predetermined range of rotational angle in both directions, it is possible to make the axial center of the piston pin move up and down (cylinder axial direction) about the center axis of the small end shaft receiving hole. Due to this, it is possible to make the length from the axial center of the piston pin to the axial center of the crank pin (below, referred to as the "connecting rod length") change. As a result, for example, if lengthening the connecting rod length, the volume of a combustion chamber when a piston is positioned at compression top dead center becomes smaller, so it is possible to raise the mechanical compression ratio of the internal combustion engine. On the other hand, conversely, if making the connecting rod length shorter, the volume of the combustion chamber when the piston is positioned at compression top dead center becomes larger, so the mechanical compression ratio of the internal combustion engine can be lowered.

SUMMARY OF DISCLOSURE

Here, the above-mentioned conventional variable compression ratio mechanism was configured so as to restrict the rotational angle of the eccentric member by finally making the eccentric member abut against a stopper when making the eccentric member turn. However, the above-mentioned conventional variable compression ratio mechanism did not control the speed of turn of the eccentric member, so the impact noise when the eccentric member struck the stopper became larger and noise was liable to be generated.

The present disclosure was made focusing on such a problem and has as its object to suppress the noise generated from a variable compression ratio mechanism changing a connecting rod length to change a mechanical compression ratio of an internal combustion engine.

To solve this problem, according to one aspect of the present disclosure, there is provided a variable compression ratio mechanism changing a connecting rod length in a span from an axial center of a piston pin to an axial center of a crank pin of a crankshaft so as to change a mechanical compression ratio of an internal combustion engine, provided with a connecting rod provided with a first shaft receiving hole formed at a small end and a second shaft receiving hole formed at a big end and supporting a crank pin, an eccentric member inserted into the first shaft receiving hole to be able to rotate and supporting the piston pin so that the axial center of the piston pin is positioned at a position offset from a center axis of the first shaft receiving hole by exactly a predetermined amount, stoppers provided at the small end, abutting against the eccentric member to restrict a rotational range of the eccentric member, and making the eccentric member stop at a low compression ratio position where the connecting rod length becomes short and a high compression ratio position where the connecting rod length becomes long, a first gear provided at the eccentric member and rotating together with the eccentric member, a second gear attached to the connecting rod to be able to rotate and engaging with the first gear to make the first gear rotate, and a gear drive mechanism for making the second gear rotate to make the eccentric member rotate. Further, the gear drive mechanism is provided with a gear drive pin provided at the second gear, a first movable member and second movable member housed in a counterweight of the crankshaft and configured to be able to move to the gear drive pin side when making the eccentric member rotate, a first guide groove formed at a surface of the first movable member facing the gear drive pin and engaging with the gear drive pin when making the eccentric member rotate from the high compression ratio position toward the low compression ratio position, and a second guide groove formed at a surface of the second movable member facing the gear drive pin and engaging with the gear drive pin when making the eccentric member rotate from the low compression ratio position toward the high compression ratio position and is configured so as to make the gear drive pin moving relative to the counterweight move along the first guide groove and the second guide groove to make the second gear rotate.

According to this aspect of the present disclosure, it is possible to suppress the noise generated from the variable compression ratio mechanism when making the connecting rod length change to change the mechanical compression ratio of the internal combustion engine.

DESCRIPTION OF EMBODIMENTS

Figure 1:
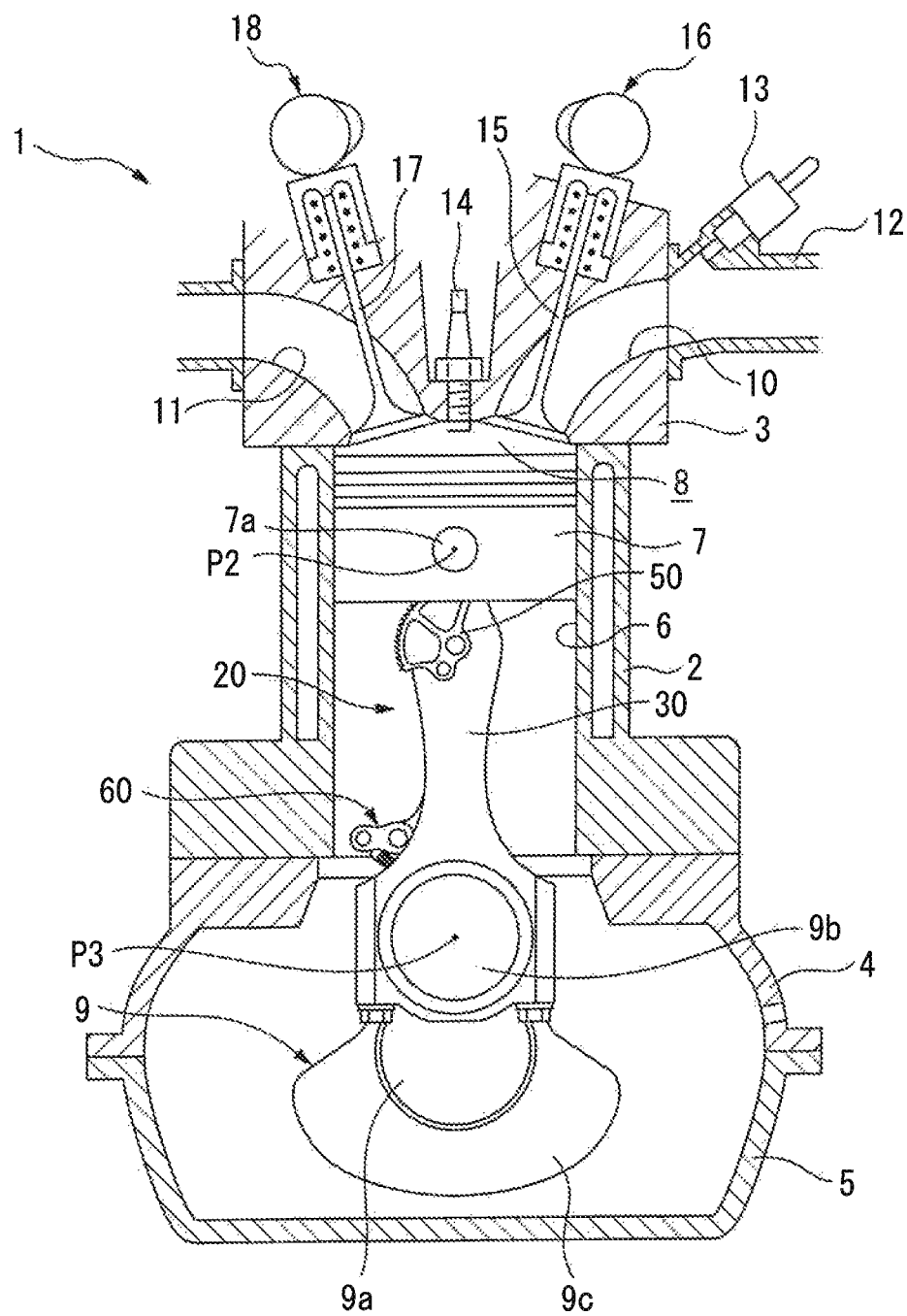
FIG. 1 is a schematic cross-sectional view of an internal combustion engine provided with a variable compression ratio mechanism according to a first embodiment of the present disclosure.

Below, referring to the drawings, embodiments of the present disclosure will be explained in detail. Note that in the following explanation, similar component elements are assigned the same reference numerals.

First Embodiment

FIG. 1 is a schematic cross-sectional view of an internal combustion engine 1 provided with a variable compression ratio mechanism according to a first embodiment of the present disclosure 20.

As shown in FIG. 1, the internal combustion engine 1 is provided with a cylinder block 2, a cylinder head 3 attached above the cylinder block 2, a crankcase 4 attached below the cylinder block 2, and an oil pan 5 attached below the crankcase 4.

The cylinder block 2 is formed with cylinders 6. In the present embodiment, four cylinders 6 are formed in a line along a long direction of the cylinder block 2. At the insides of the cylinders 6, pistons 7 are held receiving combustion pressure and moving back and forth through the insides of the cylinders 6. The spaces defined by the cylinder head 3, cylinders 6, and pistons 7 become combustion chambers 8.

The pistons 7 are connected to a crankshaft 9 supported inside the crankcase 4 to be able to rotate through a connecting rod 30 forming part of the later explained variable compression ratio mechanism 20. Due to the crankshaft 9, the reciprocating motion of the pistons 7 is converted to rotary motion. The crankshaft 9 is provided with crank journals 9a supported by the crankcase 4 to be able to rotate, crank pins 9b rotating about the crank journals 9a, and counterweights 9c for making the crankshaft 9 smoothly rotate.

The cylinder head 3 is formed with intake ports 10 opening at one side surface of the cylinder head 3 (right side in figure) and opening at the combustion chambers 8 and exhaust ports 11 opening at the other side surface of the cylinder head 3 (left side in figure) and opening at the combustion chambers 8.

Further, at the cylinder head 3, spark plugs 14 for igniting an air-fuel mixture of fuel injected from fuel injectors 13 attached to an intake manifold 12 and air inside the combustion chambers 8 are attached so as to face the combustion chambers 8. Note that, the fuel injectors 13 may be attached to the cylinder head 3 so as to enable fuel to be directly injected into the combustion chambers 8.

Further, the cylinder head 3 is provided with intake valves 15 for opening and closing the openings between the combustion chambers 8 and intake ports 10 and an intake valve operating device 16 for driving operation of the intake valves 15. Furthermore, the cylinder head 3 is provided with exhaust valves 17 for opening and closing the openings between the combustion chambers 8 and exhaust ports 11 and an exhaust valve operating device 18 for driving operation of the exhaust valves 17.

The variable compression ratio mechanism 20 is configured so as to be able to change the volume of a combustion chamber 8 when a piston 7 is positioned at top dead center by changing the connecting rod length (length from axial center of piston pin 7a (=center axis P2 of later explained eccentric shaft bearing 44) to the axial center P3 of the crank pin 9b). By lengthening the connecting rod lengths, the volumes of the combustion chambers 8 when the pistons 7 are positioned at top dead center become smaller, so it is possible to raise the mechanical compression ratio of the internal combustion engine 1. On the other hand, by shortening the connecting rod lengths, the volumes of the combustion chambers 8 when the pistons 7 are positioned at top dead center become larger, so it is possible to lower the mechanical compression ratio of the internal combustion engine 1. Below, details of the variable compression ratio mechanism 20 according to the present embodiment will be explained referring to FIG. 2 to FIG. 13.

Figure 2:
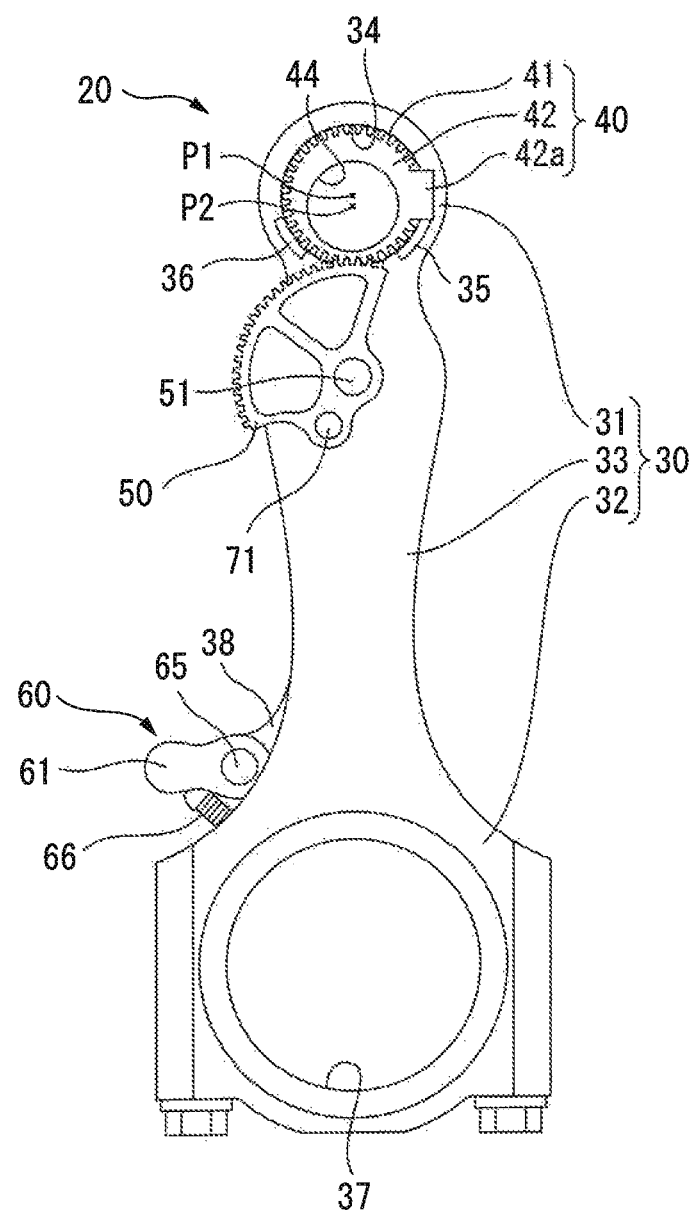
FIG. 2 is a schematic front view of the variable compression ratio mechanism according to the first embodiment of the present disclosure.
Figure 3:
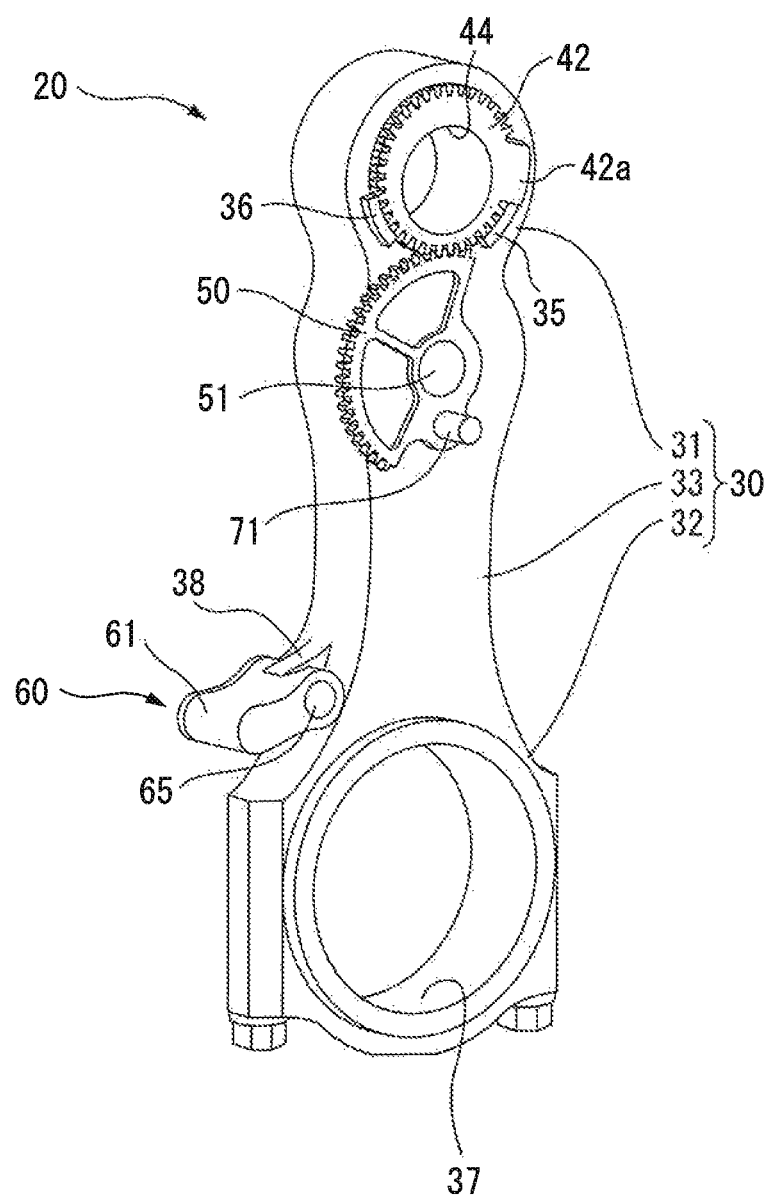
FIG. 3 is a schematic perspective view in the case of viewing the variable compression ratio mechanism according to the first embodiment of the present disclosure from the front side.
Figure 4:
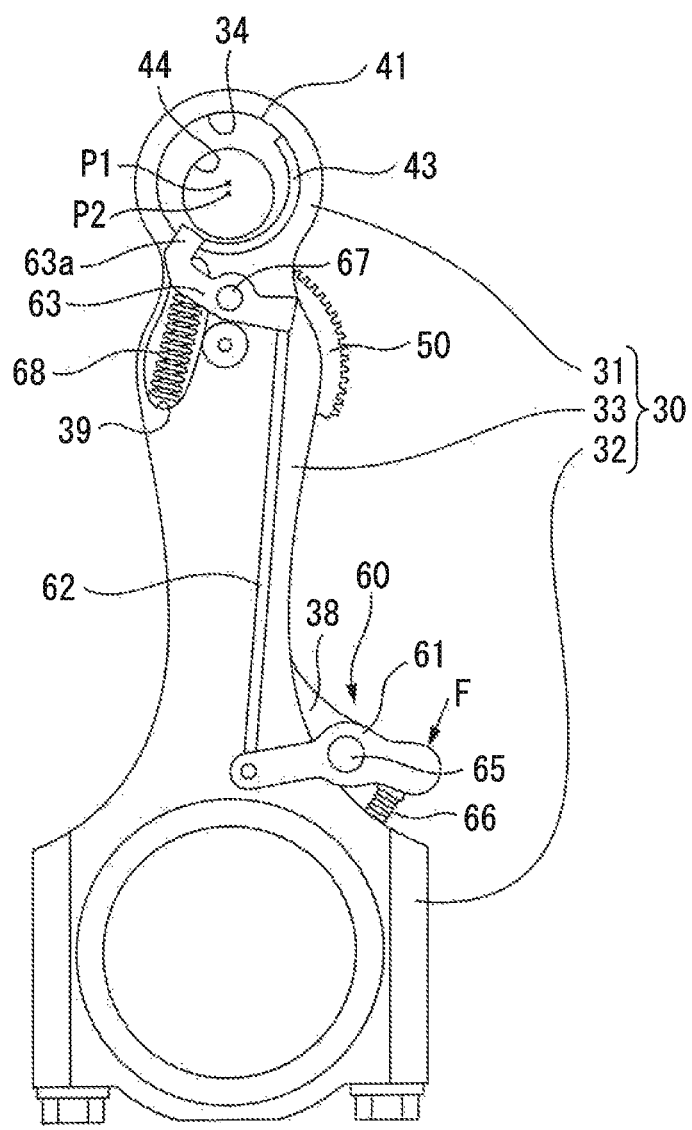
FIG. 4 is a schematic back view of the variable compression ratio mechanism according to the first embodiment of the present disclosure.
Figure 5:
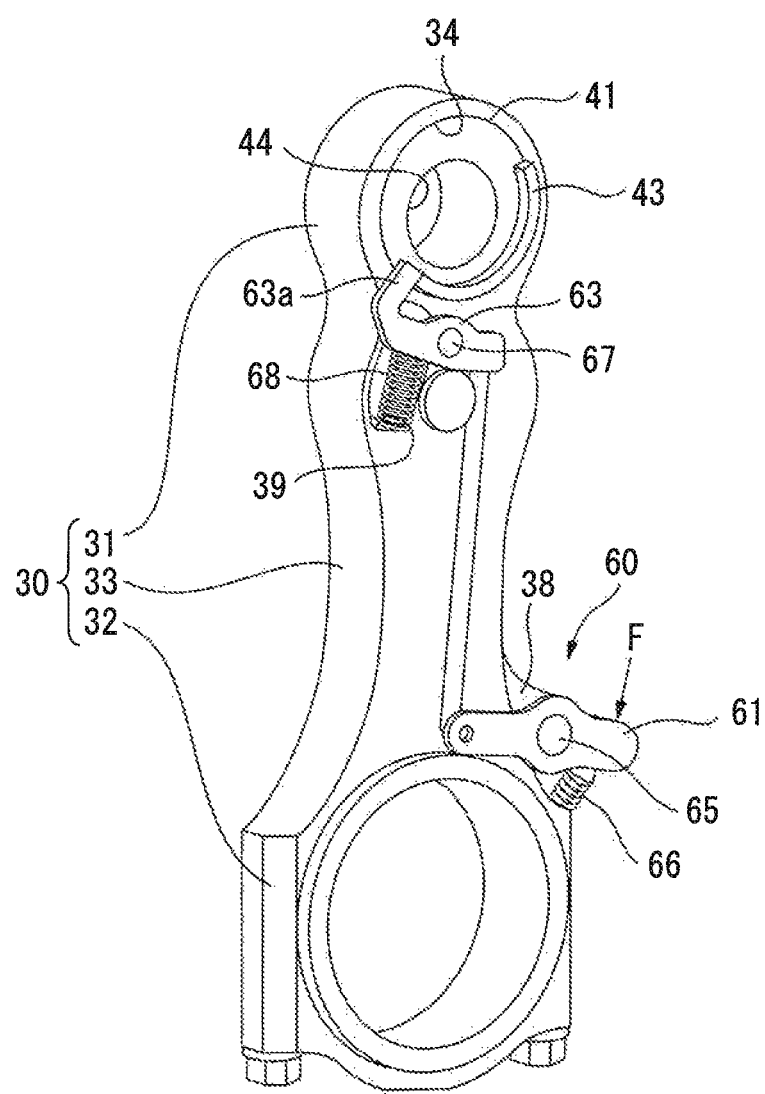
FIG. 5 is a schematic perspective view in the case of viewing the variable compression ratio mechanism according to the first embodiment of the present disclosure from the back side.

FIG. 2 is a schematic front view of the variable compression ratio mechanism 20. FIG. 3 is a schematic perspective view in the case of viewing the variable compression ratio mechanism 20 from the front side. FIG. 4 is a schematic back view of the variable compression ratio mechanism 20. FIG. 5 is a schematic perspective view in the case of viewing the variable compression ratio mechanism 20 from the back side. Note that in the following explanation, for convenience, the direction matching the axial direction of the cylinder (up-down direction of FIG. 2) will be referred to as the "connecting rod length direction", the direction matching the block long direction (depth direction of paper of FIG. 2) will be referred to as "the connecting rod thickness direction", and the direction matching the block short direction (left-right direction of FIG. 2) will be referred to as the "connecting rod width direction".

The variable compression ratio mechanism 20 is provided with a connecting rod 30, eccentric member 40, segment gear 50, lock mechanism 60 for fastening the eccentric member 40, and gear drive mechanism 70 for making the segment gear 50 turn to make the eccentric member 40 turn. Below, first, referring to FIG. 2 to FIG. 8, the specific configurations of the connecting rod 30, eccentric member 40, segment gear 50, and lock mechanism 60 will be explained. After that, referring to FIG. 9 to FIG. 12, the specific configurations of the gear drive mechanism 70 will be explained.

The connecting rod 30 is a member for connecting the piston 7 and the crankshaft 9 and is provided with a small end 31, big end 32, and rod part 33.

The small end 31 is a part formed at one end side in the connecting rod length direction (piston 7 side) and functioning as a bearing supporting the piston 7 through the piston pin 7a. At the small end 31, a small end shaft receiving hole 34 for insertion of the eccentric member 40 is formed.

Further, at the front surface of the small end 31, a first stopper 35 and second stopper 36 sticking out from the front surface of the small end 31 in the connecting rod thickness direction are formed. The first stopper 35 and the second stopper 36 abut against a toothless part 42a of the later explained eccentric member 40 and restrict the range of rotational angle of the eccentric member 40 to a predetermined range of rotational angle (in the present embodiment, about 180°).

The big end 32 is a part formed at the other end side of the connecting rod length direction (crankshaft 9 side) and functioning as a bearing supporting the crank pin 9b. At the big end 32, a big end shaft receiving hole 37 for insertion of the crank pin 9b is formed.

The rod part 33 is a part extending from the small end 31 to the big end 32 in the connecting rod length direction. At the rod part 33, an arm support 38 sticking out from one side surface (in FIG. 2 and FIG. 3, left side in figure and in FIG. 4 and FIG. 5, right side in figure) to the connecting rod width direction and functioning as a bearing for supporting the later explained locker arm 61 is formed.

The eccentric member 40 is a member inserted into the small end shaft receiving hole 34 to be able to rotate and supporting the piston pin 7a so that the axial center of the piston pin 7a is positioned at a position offset by exactly a predetermined amount from the center axis P1 of the small end shaft receiving hole 34. The eccentric member 40 is provided with a columnar main body 41, a partially toothed gear 42 provided at the front side of the main body 41 (see FIG. 2 and FIG. 3), and an engaging part 43 provided at the back side of the main body 41 (see FIG. 4 and FIG. 5).

The main body 41 is formed with an outside diameter substantially matching the inside diameter of the small end shaft receiving hole 34 and is inserted into the small end shaft receiving hole 34 so as to be able to turn in both directions about the center axis P1 of the small end shaft receiving hole 34 as the center of rotation. At the main body 41, an eccentric shaft bearing 44 having a center axis P2 at a position offset from the center axis P1 of the small end shaft receiving hole 34 by exactly a predetermined amount is formed. In the eccentric shaft bearing 44, the piston pin 7a is inserted. Therefore, assuming making the eccentric member 40 rotate one turn, the axial center of the piston pin 7a (=center axis P2 of eccentric shaft bearing 44) rotates one turn about the center axis P1 of the small end shaft receiving hole 34.

As shown in FIG. 2 and FIG. 3, the partially toothed gear 42 is an external gear having a toothless part 42a at part and is formed at the front surface of the main body 41 so as to follow along the circumferential direction of the main body 41. By making the partially toothed gear 42 rotate, the main body 41 rotates together with the partially toothed gear 42. The toothless part 42a, when viewing the connecting rod 30 from the front, is designed to finally abut against the first stopper 35 when making the partially toothed gear 42 turn clockwise. Further, it is designed to finally abut against the second stopper 36 when conversely making the partially toothed gear 42 turn counterclockwise.

As shown in FIG. 4 and FIG. 5, the engaging part 43 is a part sticking out from the back surface of the main body 41 in the rod thickness direction. In the present embodiment, the engaging part 43 is formed along the circumferential direction of the main body 41 over about half of the circumference of the main body 41. The engaging part 43 abuts against the lock lever 63 of the later explained lock mechanism 60 to prevent the eccentric member 40 from turning in a specific direction.

As shown in FIG. 2 and FIG. 3, the segment gear 50 is fan-shaped external gear provided at the front side of the connecting rod 30 so as to constantly mesh with the partially toothed gear 42 and functions to transmit power to the partially toothed gear 42 to make the partially toothed gear 42 and in turn the eccentric member 40 turn. The segment gear 50 is supported by a gear fastening pin 51 at the connecting rod 30 to be able to rotate and is designed to turn in both directions about the gear fastening pin 51 as the center of rotation. Note that, in the present embodiment, the range of rotational angle of the eccentric member 40 is restricted by the first stopper 35 and the second stopper 36 formed at the front surface of the small end 31, so the range of rotational angle of the segment gear 50 is also restricted.

Further, at the segment gear 50, a columnar gear drive pin 71 sticking out from the surface of the segment gear 50 in the connecting rod thickness direction is formed. The gear drive pin 71 is a part forming part of the later explained gear drive mechanism 70. Details of the function of the gear drive pin 71 will be explained with reference to FIG. 9 to FIG. 12.

Figure 6:
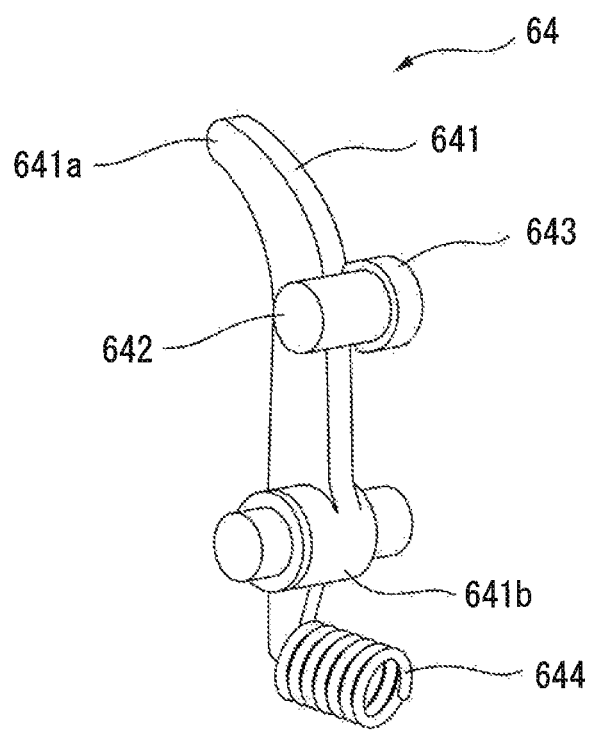
FIG. 6 is a perspective view of an arm drive mechanism.
Figure 7:
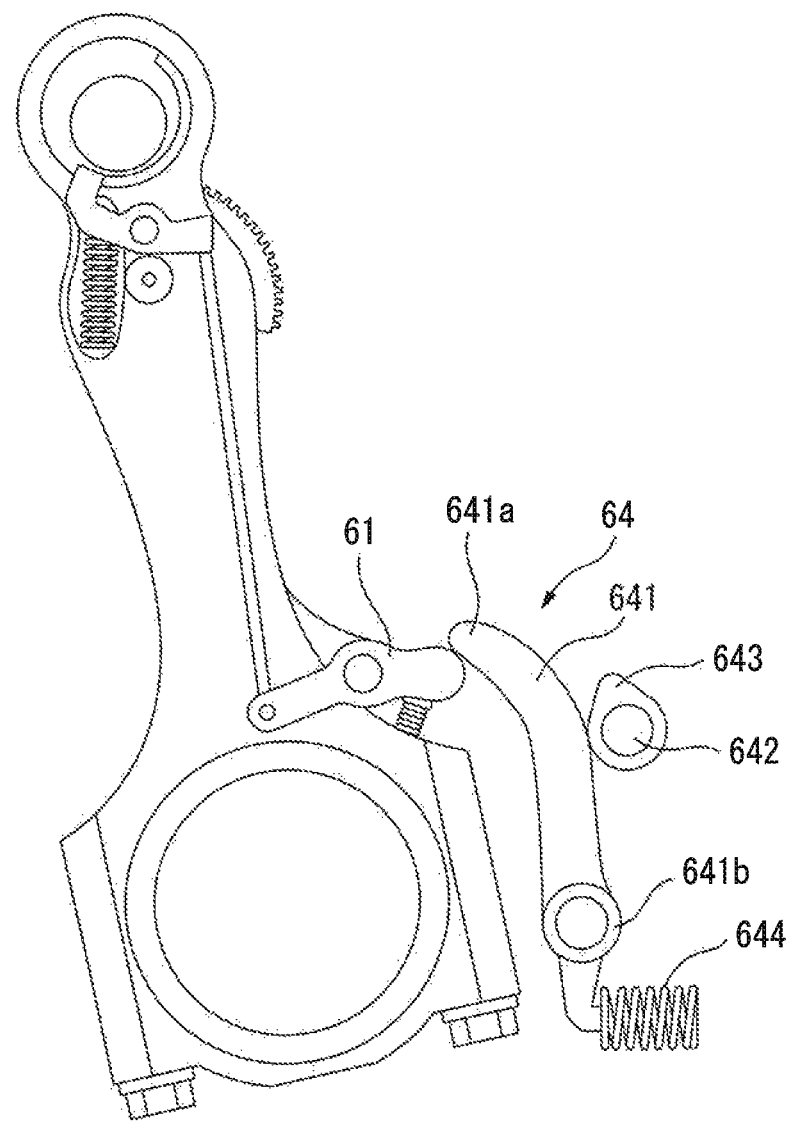
FIG. 7 is a view showing a positional relationship of the arm drive mechanism etc. at a predetermined timing in an exhaust stroke.

As shown in FIG. 4 and FIG. 5, the lock mechanism 60 is a mechanism provided at a back surface side of the connecting rod 30 for fastening (engaging with) the eccentric member 40 and preventing the eccentric member 40 from turning in a specific direction. The lock mechanism 60 is provided with a locker arm 61, push rod 62, and lock lever 63. Further, as shown in FIG. 6 and FIG. 7, the lock mechanism 60 is further provided with an arm drive mechanism 64.

Below, first, referring to FIG. 4 and FIG. 5, details of the locker arm 61, push rod 62, and lock lever 63 will be explained.

The locker arm 61 is supported at its center part by an arm support shaft 65 so as to be able to swing within a predetermined range of rotational angle about an axial center of an arm support shaft 65 supported at the arm support 38 to be able to rotate.

At the end of the locker arm 61 at the outside from the center part in the rod width direction (in FIG. 4 and FIG. 5, right side from center part) (below, referred to as the "outside end"), external force F is imparted for pushing down the outside end pivoting about the arm support shaft 65. In the present embodiment, while not shown in FIG. 4 and FIG. 5, the arm drive mechanism 64 explained later referring to FIG. 6 and FIG. 7 can be used to push down the outside end of the locker arm 61. Further, at the outside end of the locker arm 61, one end side of a first spring 66 is fastened for imparting to the locker arm 61 a force to push up the outside end when the outside end of the locker arm 61 is pushed down. The other end side of the first spring 66 is fastened to the side surface of the connecting rod 30.

At the end of the locker arm 61 at the inside from the center part in the rod width direction (in FIG. 4 and FIG. 5, left side from center part) (below, referred to as the "inside end"), the base end of the push rod 62 is fastened.

The push rod 62 is a rod-shaped member extending from the big end 32 side to the small end 31 side and transmits the locking operation of the locker arm 61 to the lock lever 63. The push rod 62, as explained above, is fastened at its base end to the inside end of the locker arm 61 and is arranged at the rod part 33 so that its front end abuts against the bottom surface of the end of one end side of the lock lever 63 (in FIG. 4 and FIG. 5, right side). Therefore, if the outside end of the locker arm 61 is pushed down pivoting about the arm support shaft 65 and the inside end of the locker arm 61 is pushed up, the end of one end side of the lock lever 63 is pushed up by the push rod 62.

The lock lever 63 is supported by a lever fastening pin 67 at the connecting rod 30 to be able to turn so as to enable it to swing within a predetermined range of rotational angle about the lever fastening pin 67 as the center of rotation. The lock lever 63, as explained above, abuts against a front end of the push rod 62 at the bottom surface of the end of one end side (in FIG. 4 and FIG. 5, right side).

At the other end side of the lock lever 63 (in FIG. 4 and FIG. 5, left side), a hook part 63a with a front end bent toward the top side in the rod length direction (small end 31 side) is formed. By making this hook part 63a abut against the engaging part 43 of the eccentric member 40, the eccentric member 40 is fastened and the eccentric member 40 is prevented from turning in a specific direction. For example, when in the state shown in FIG. 4 and FIG. 5, the hook part 63a prevents the eccentric member 40 from turning clockwise in the figure. Further, if due to the push rod 62, the end of one end side of the lock lever 63 is pushed up pivoting about the lever fastening pin 67 and the other end side of the lock lever 63 is pushed down, the fastening action (engagement) on the eccentric member 40 by the hook part 63a is released.

Further, at the bottom surface of the other end side of the lock lever 63, one end side of a second spring 68 is fastened for imparting to the lock lever 63 a force pushing up the other end side of the lock lever 63 when the other end side of the lock lever 63 is pushed down. The second spring 68 is arranged at a depression 39 provided at the back side of the rod part 33. The other end side of the second spring 68 is fastened to the floor of the depression 39.

Next, referring to FIG. 6 and FIG. 7, details of the arm drive mechanism 64 will be explained. FIG. 6 is a perspective view of the arm drive mechanism 64. FIG. 7 is a view showing the positional relationship of the arm drive mechanism 64 etc. at a predetermined timing during the exhaust stroke.

As shown in FIG. 6 and FIG. 7, the arm drive mechanism 64 is provided with a shift lever 641, control shaft 642, and lever drive cam 643.

During operation of the internal combustion engine 1, together with the piston 7, the connecting rod 30 also reciprocally moves inside the cylinder 6 while changing in slant. For this reason, at the shift lever 641, as shown in FIG. 7, the base end 641b is fastened to the cylinder block 2 so as to be able to push down the outside end of the locker arm 61 by the front end 641a at a predetermined timing in one cycle of the internal combustion engine (in the example of FIG. 7, during the exhaust stroke). At the base end 641b side of the shift lever 641, a third spring 644 is provided for returning the shift lever 641 in the state pushing down the outside end of the locker arm 61 to its original state.

The control shaft 642 extends in the connecting rod thickness direction and, for example, is supported at the cylinder block 2 to be able to rotate so as to be made able to rotate at any timing due to the electromagnetic actuator etc.

The lever drive cam 643 is fastened to the control shaft 642 so as to abut against the shift lever 641. When making the control shaft 642 rotate, the drive cam drives the shift lever 641 by the cam part and pushes down the outside end of the locker arm 61.

Figure 8:
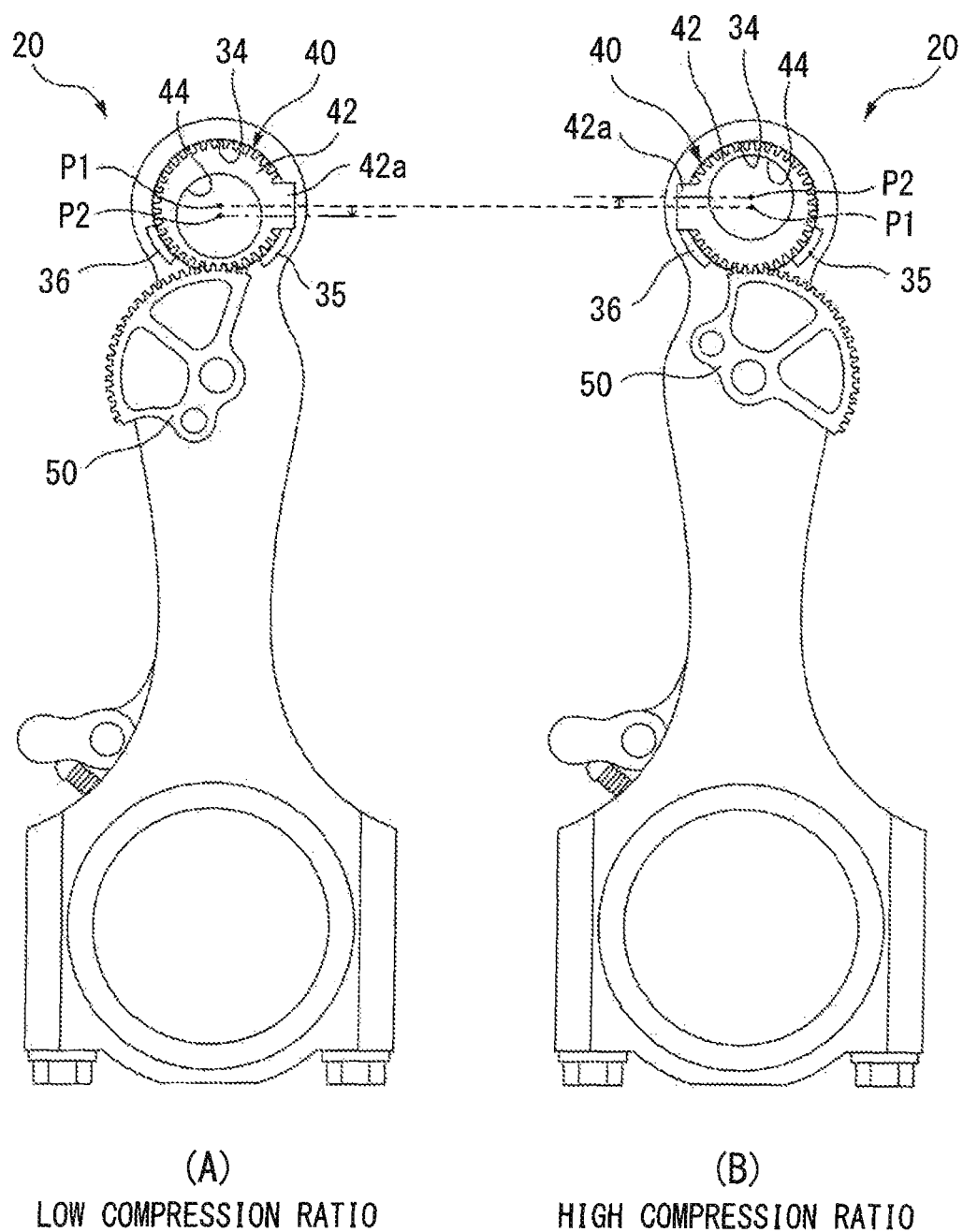
FIG. 8 is a view showing in comparison the variable compression ratio mechanism in the state with the mechanical compression ratio made a low compression ratio and the variable compression ratio mechanism in the state with the mechanical compression ratio made a high compression ratio.

FIG. 8 is a view showing in comparison the variable compression ratio mechanism 20 in the state where the mechanical compression ratio is made a low compression ratio and the variable compression ratio mechanism 20 in the state where the mechanical compression ratio is made a high compression ratio.

In the present embodiment, when in the state shown in FIG. 8(A), that is, when the toothless part 42a of the partially toothed gear 42 abuts against the first stopper 35, the center axis P2 of the eccentric shaft bearing 44 (=center axis of piston pin 7a) becomes positioned right under the center axis P1 of the small end shaft receiving hole 34. At the time of the state shown in FIG. 8(A), the center axis P2 of the eccentric shaft bearing 44 becomes positioned right below the center axis P1 of the small end shaft receiving hole 34, so the connecting rod length becomes shorter. For this reason, the volume of the combustion chamber when the piston 7 is positioned at top dead center increases, so the mechanical compression ratio becomes a low compression ratio. In this way, in the present embodiment, due to the first stopper 35, it becomes possible to stop the eccentric member 40 at the position where the connecting rod length becomes the shortest, that is, the low compression ratio position where the center axis P2 of the eccentric shaft bearing 44 is positioned right under the center axis P1 of the small end shaft receiving hole 34.

If making the segment gear 50 rotate from the state shown in FIG. 8(A) clockwise in the figure, the eccentric member 40 rotates counterclockwise in the figure until the toothless part 42a of the partially toothed gear 42 abuts against the second stopper 36 and becomes the state shown in FIG. 8(B).

Further, in the present embodiment, at the time of the state shown in FIG. 8(B), that is, when the toothless part 42a of the partially toothed gear 42 abuts against the second stopper 36, the center axis P2 of the eccentric shaft bearing 44 is positioned right above the center axis P1 of the small end shaft receiving hole 34. At the time of the state shown in FIG. 8(B), the center axis P2 of the eccentric shaft bearing 44 is positioned right above the center axis P1 of the small end shaft receiving hole 34, so the connecting rod length becomes longer. For this reason, the volume of a combustion chamber when a piston 7 is positioned at top dead center becomes smaller, so the mechanical compression ratio becomes a high compression ratio. In this way, in the present embodiment, the second stopper 36 can be used to make the eccentric member 40 stop at a position where the connecting rod length becomes the longest, that is, the high compression ratio position where the center axis P2 of the eccentric shaft bearing 44 is positioned right above the center axis P1 of the small end shaft receiving hole 34.

If making the segment gear 50 rotate counterclockwise from the state of FIG. 8(B) in the figure, the eccentric member 40 rotates clockwise in the figure until a toothless part 42a of the partially toothed gear 42 abuts against the first stopper 35 then returns to the state shown in FIG. 8(A).

In this way, in the present embodiment, the eccentric member 40 is made to rotate within a predetermined range of rotational angle in both directions so as to make the center axis of the piston pin 7a (=center axis P2 of eccentric shaft bearing 44) swing up and down about the center axis P1 of the small end shaft receiving hole 34 (cylinder axial direction) and thereby change the connecting rod length and change the mechanical compression ratio.

At this time, the variable compression ratio mechanism according to the present embodiment makes the eccentric member 40 abut against the first stopper 35 or the second stopper 36 to thereby make the eccentric member 40 stop at the low compression ratio position or high compression ratio position. For this reason, if changing the mechanical compression ratio by making the eccentric member 40 turn through the segment gear 50, each time, the eccentric member 40, that is, the toothless part 42a of the partially toothed gear 42, strikes the first stopper 35 or the second stopper 36. If the impact noise when the toothless part 42a of the partially toothed gear 42 and the first stopper 35 or the second stopper 36 strike becomes larger, the noise performance of the internal combustion engine is liable to deteriorate and, further, the vibration performance also is liable to deteriorate.

Therefore, in the present embodiment, the gear drive mechanism 70 was configured to enable control of the speed of turn of the eccentric member 40 when changing the mechanical compression ratio by making the eccentric member 40 turn through the segment gear 50. Below, referring to FIG. 9 to FIG. 12, the detailed configuration of the gear drive mechanism 70 according to the present embodiment will be explained.

Figure 9:
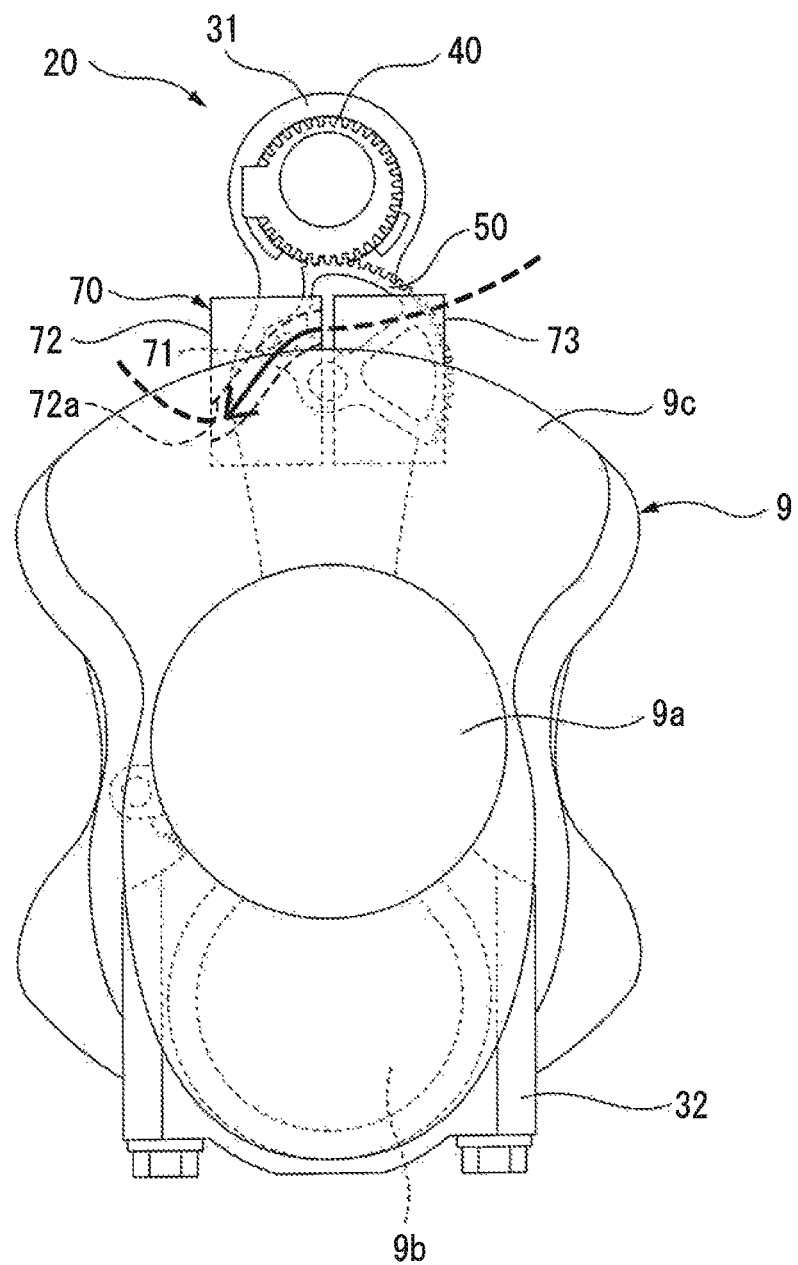
FIG. 9 is a front view showing the state before switching the mechanical compression ratio from the high compression ratio to the low compression ratio.
Figure 10:
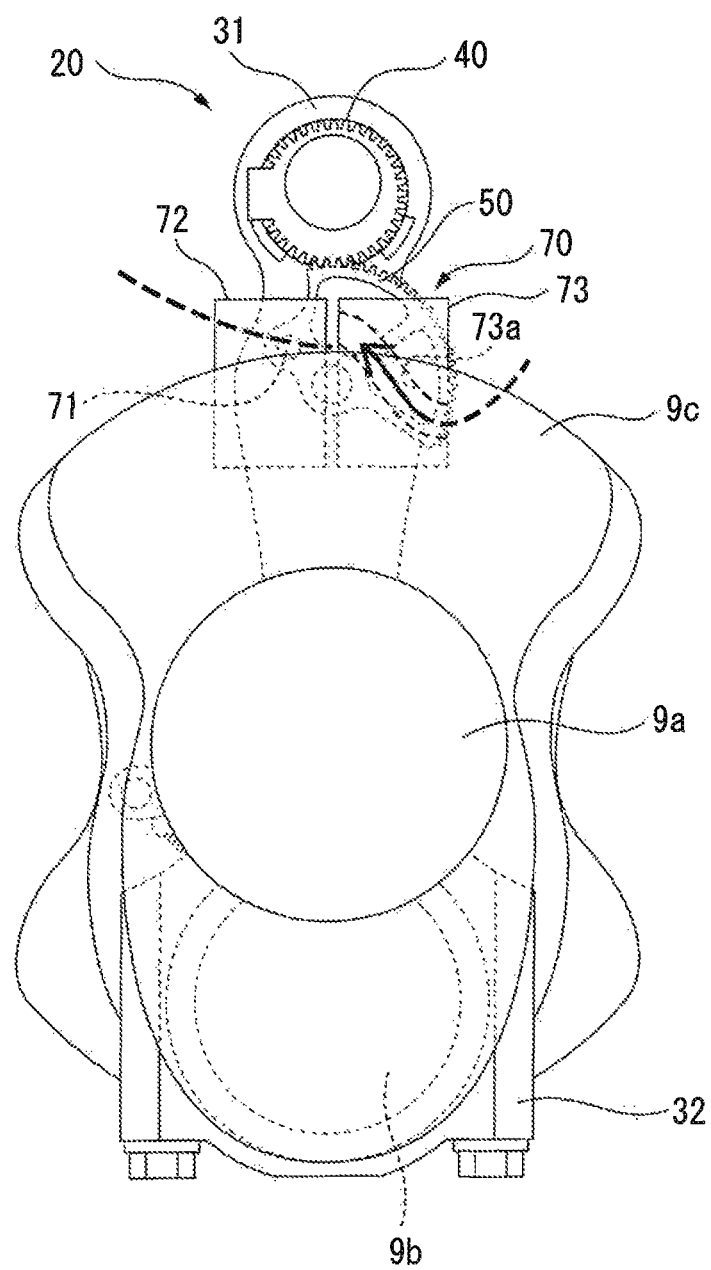
FIG. 10 is a front view showing the state after switching the mechanical compression ratio from the low compression ratio to the high compression ratio.

FIG. 9 is a front view showing the positional relationship of the variable compression ratio mechanism 20 and crankshaft 9 when a piston 7 is at bottom dead center and showing the state before using the gear drive mechanism 70 to make the segment gear 50 rotate counterclockwise in the figure, that is, before switching the mechanical compression ratio from a high compression ratio to a low compression ratio. FIG. 10 is a front view showing the positional relationship of the variable compression ratio mechanism 20 and crankshaft 9 when the piston 7 is at bottom dead center and showing the state after using the gear drive mechanism 70 to make the segment gear 50 rotate clockwise in the figure, that is, after switching the mechanical compression ratio from the low compression ratio to the high compression ratio. Note that the solid lines and broken lines of FIG. 9 and FIG. 10 show the path of the gear drive pin 71 when the piston 7 is positioned near bottom dead center during operation of the internal combustion engine 1.

Figure 11:
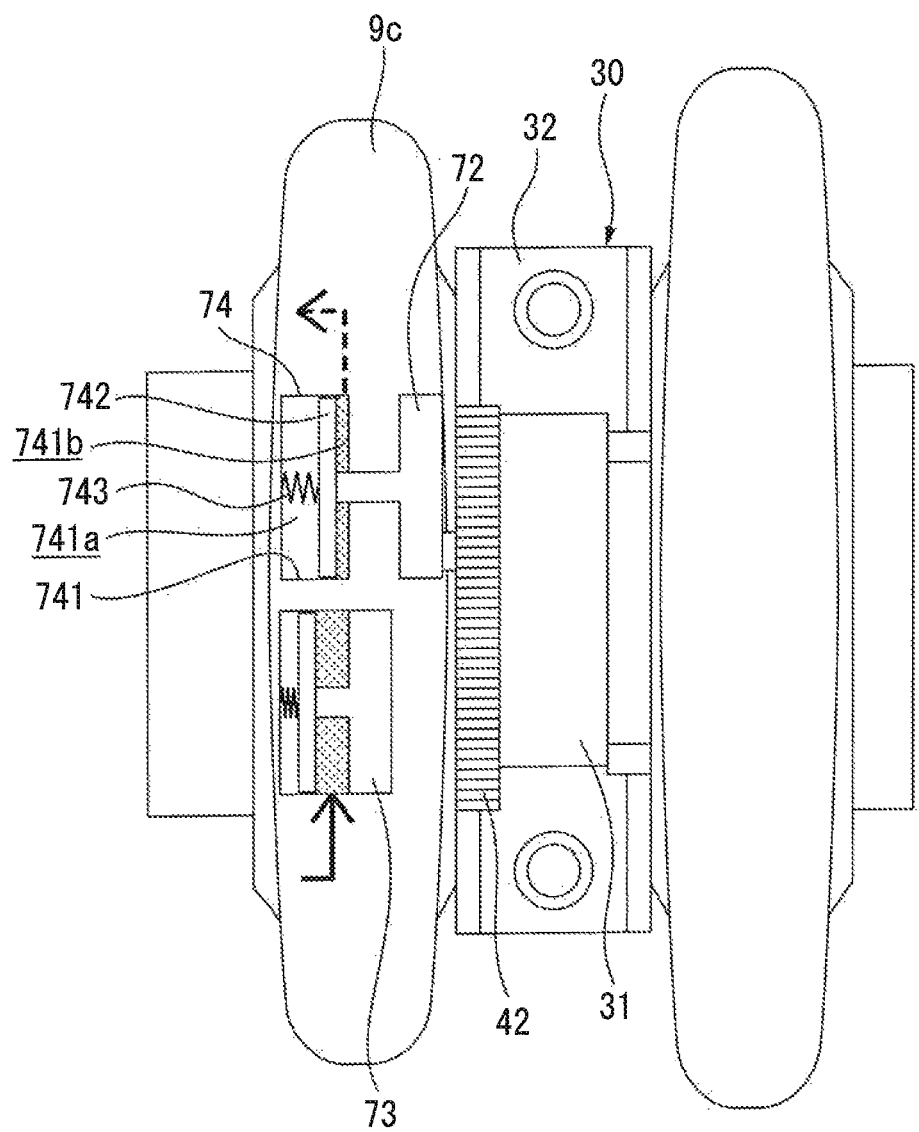
FIG. 11 is a plan view corresponding to FIG. 9.
Figure 12:
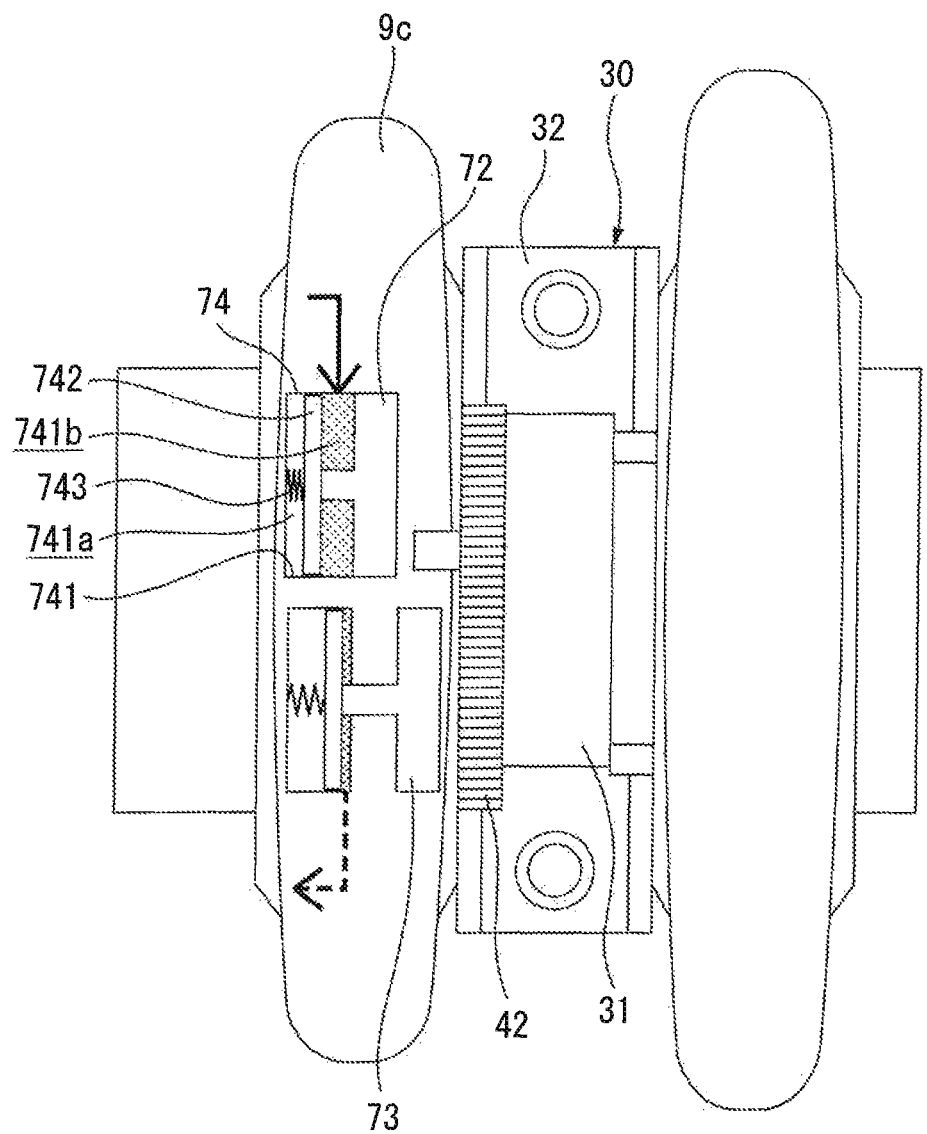
FIG. 12 is a plan view corresponding to FIG. 10.

Further, FIG. 11 is a plan view corresponding to FIG. 9. FIG. 12 is a plan view corresponding to FIG. 10.

As shown from FIG. 9 to FIG. 12, the gear drive mechanism 70 is provided with a gear drive pin 71 provided at a segment gear 50, a first switching rail 72 and second switching rail 73 housed in the counterweight 9c, and a switching rail drive device 74 for driving the first switching rail 72 and the second switching rail 73.

As shown in FIG. 11 and FIG. 12, the first switching rail 72 is usually housed in the counterweight 9c so as to face the connecting rod 30 and is designed to be able to be moved toward the connecting rod 30 side by the switching rail drive device 74.

Further, as shown in FIG. 9, at the surface of the first switching rail 72 facing the connecting rod 30, a first guide groove 72a is formed which is positioned on the path of the gear drive pin 71 and in which the gear drive pin 71 is fit when, in the case where the mechanical compression ratio is the high compression ratio, the piston 7 moves to near bottom dead center in the state where the first switching rail 72 is made to move toward the connecting rod 30 side by the switching rail drive device 74.

The first guide groove 2a is made a groove shape enabling the gear drive pin 71 to fit in it, then enabling the gear drive pin 71 to be made to move toward the lower side in the connection rod length direction (big end 32 side) along with movement of the piston 7 and thereby enabling the segment near 50 to be made to rotate counterclockwise in FIG. 9 to switch the mechanical compression ratio from the high compression ratio to the low compression ratio. That is, in the present embodiment, the gear drive pin 71 is made to move toward the lower side in the connecting rod length direction along the first guide groove 72a so as to make the segment gear 50 and in turn the eccentric member 40 turn and switch the mechanical compression ratio from the high compression ratio to the low compression ratio.

Further, as shown in FIG. 11 and FIG. 12, the second switching rail 73 as well, in the same way as the first switching rail 72, is usually housed in the counterweight 9c so as to face the connecting rod 30 and is designed so that the switching rail drive device 74 can be used to make it move toward the connecting rod 30 side.

Further, as shown in FIG. 10, at the surface of the second switching rail 73 facing the connecting rod 30, a second guide groove 73a is formed which is positioned on the path of the gear drive pin 71 and in which the gear drive pin 71 is fit when, in the case where the mechanical compression ratio is the low compression ratio, the piston 7 moves to near bottom dead center in the state where the second switching rail 73 is made to move toward the connecting rod 30 side by the switching rail drive device 74.

The second guide groove 73a is made a groove shape making the gear drive pin 71 move upward in the length direction of the connecting rod (small end 31 side) along with movement of the piston 7 after the gear drive pin 71 is fit in and thereby making the segment gear 50 rotate clockwise in FIG. 10 to enable the mechanical compression ratio to be switched from the low compression ratio to the high compression ratio. That is, in the present embodiment, the gear drive pin 71 is made to move upward in the length direction of the connecting rod along the second guide groove 73a so as to make the segment gear 50 and in turn the eccentric member 40 turn and switch the mechanical compression ratio from the low compression ratio to the high compression ratio.

Here, the gear drive pin 71, as shown by the solid lines and broken lines in FIG. 9 and FIG. 10, near bottom dead center, moves from right direction toward the left direction in the figure in the connecting rod width direction along with movement of the piston 7. When the gear drive pin 71 is moving in the connecting rod width direction along the first guide groove 72a and the second guide groove 73a, the speed of movement of the gear drive pin 71 in the connecting rod width direction becomes a substantially constant speed of movement corresponding to the engine speed of turn.

Therefore, the larger the amount of movement of the gear drive pin 71 to the length direction side of the connecting rod per unit time, the faster the speed of turn of the segment gear 50 and in turn the eccentric member 40. That is, the larger the slants of the groove shapes of the first guide groove 72a and the second guide groove 73a, the faster the speed of turn of the segment gear 50 and in turn the eccentric member 40 can be made. On the other hand, the smaller the slants of the groove shapes of the first guide groove 72a and the second guide groove 73a, the slower the speed of turn of the segment gear 50 and in turn the eccentric member 40 can be made. In this way, according to the gear drive mechanism 70 according to the present embodiment, by changing the slants of the groove shapes of the first guide groove 72a and the second guide groove 73a, it is possible to control the speed of turn of the segment gear 50 and in turn the eccentric member 40.

Therefore, in the present embodiment, the slants of the groove shapes of the second halves of the first guide groove 72a and the second guide groove 73a were made smaller. That is, in the present embodiment, the groove shapes of the first guide groove 72a and the second guide groove 73a were made groove shapes making the segment gear 50 rotate so that the speed of turn of the eccentric member 40 after making the eccentric member 40 rotate by exactly a predetermined angle becomes lower than the speed of turn of the eccentric member 40 before making it rotate by exactly a predetermined angle. Due to this, it is possible to slow the speed of turn of the eccentric member 40 before the toothless part 42a of the partially toothed gear 42 and a stopper collide, so impact noise can be suppressed. As a result, the vibration due to impact can also be suppressed.

As shown in FIG. 11 and FIG. 12, the switching rail drive device 74 according to the present embodiment is provided with a piston chamber 741 formed inside a counterweight 9c and a switching piston 742 held inside the piston chamber 741 and connected with the first switching rail 72. The piston chamber 741 is separated into two chambers by the switching piston 742. At the spring chamber 741a of one of the two chambers, a fourth spring 743 is arranged constantly biasing the switching piston 742 to the connecting rod 30 side. Further, at the hydraulic chamber 741b of the other of the two chambers, a supply passage of hydraulic fluid (not shown) is connected. This is designed so that hydraulic fluid can be supplied to and discharged from the hydraulic chamber 741b.

By supplying hydraulic fluid to the hydraulic chamber 741b, the oil pressure causes the switching piston 742 to move to the side opposite to the connecting rod 30 against the biasing force of the fourth spring 743, so it is possible to prevent the gear drive bin 71 from fitting into the first guide groove 72a of the first switching rail 72.

On the other hand, by discharging hydraulic fluid from the hydraulic chamber 741b, the switching piston 742 moves toward the connecting rod 30 side due to the biasing force of the fourth spring 743, so the gear drive pin 71 can be fit into the first guide groove 72a of the first switching rail 72.

According to the present embodiment explained above, there is provided the variable compression ratio mechanism 20 changing the mechanical compression ratio of the internal combustion engine by changing the length of the connecting rod in the span between the axial center of the piston pin 7a to the axial center of the crank pin 9b of the crankshaft 9 provided with the connecting rod 30 provided with the small end shaft receiving hole 34 formed at the small end 31 (first shaft receiving hole) and the big end shaft receiving hole 37 formed at the big end 32 and supporting the crank pin 9b (second shaft receiving hole), the eccentric member 40 inserted into the small end shaft receiving hole 34 to be able to rotate and supporting the piston pin 7a so that the axial center of the piston pin 7a is positioned at a position offset from the center axis P1 of the small end shaft receiving hole 34 by exactly a predetermined amount, the first stopper 35 and the second stopper 36 (stoppers) provided at the small end 31, abutting against the eccentric member 40 to restrict the rotational angle of the eccentric member 40, and making the eccentric member 40 stop at the low compression ratio position where the connecting rod length become short and the high compression ratio position where the connecting rod length becomes long, the partially toothed gear 42 (first gear) provided at the eccentric member 40 and rotating together with the eccentric member 40, the segment gear 50 (second gear) attached to the connecting rod 30 to be able to rotate and engaging with the partially toothed gear 42 to make the partially toothed gear 42 rotate, and the gear drive mechanism 70 for making the segment gear 50 turn to make the eccentric member 40 turn.

Further, the gear drive mechanism 70 is provided with the gear drive pin 71 provided at the segment gear 50, the first switching rail 72 (first movable member) and the second switching rail 73 (second movable member) housed in the counterweight 9c of the crankshaft 9 and configured to be able to move to the gear drive pin 71 side when making the eccentric member 40 rotate, the first guide groove 72a formed at the surface of the first switching rail 72 facing the gear drive pin 71 and engaging with the gear drive pin 71 when making the eccentric member 40 turn from the high compression ratio position toward the low compression ratio position, and the second guide groove 73a formed at the surface of the second switching rail 73 facing the gear drive pin 71 and engaging with the gear drive pin 71 when making the eccentric member 40 rotate from the low compression ratio position toward the high compression ratio position and is configured to make the gear drive pin 71 moving relative to the counterweight 9c move along the first guide groove 72a and the second guide groove 73a to make the segment gear 50 rotate.

In this way, by making the gear drive pin 71 move along the first guide groove 72a and the second guide groove 73a, it is possible to change the speed of turn of the segment gear 50 according to the groove shapes of the first guide groove 72a and the second guide groove 73a. For this reason, it is possible to change the speed of turn of the eccentric member 40 made to rotate by the segment gear 50.

Therefore, by making the groove shapes of the first guide groove 72a and the second guide groove 73a groove shapes whereby the speed of turn of the eccentric member 40 before the eccentric member 40 strikes the first stopper 35 and the second stopper 36 becomes relatively slower, it is possible to reduce the impact noise when the eccentric member 40 strikes the first stopper 35 and the second stopper 36. For example, in the present embodiment, the groove shapes of the first guide groove 72a and the second guide groove 73a are made groove shapes making the segment gear 50 rotate so that the speed of turn of the eccentric member 40 after making the eccentric member 40 rotate by exactly a predetermined angle becomes lower than the speed of turn of the eccentric member 40 before making it rotate by exactly a predetermined angle, and the impact noise when the eccentric member 40 strikes the first stopper 35 and the second stopper 36 is reduced. Due to this, it is possible to suppress deterioration of the noise performance and vibration performance of the internal combustion engine 1.

Further, the gear drive mechanism 70 according to the present embodiment is provided with the switching rail drive device 74 (movable member drive device) making the first switching rail 72 move to the gear drive pin 71 side to make the gear drive pin 71 engage with the first guide groove 72a when making the eccentric member 40 rotate from the high compression ratio position toward the low compression ratio position and making the second switching rail 73 move to the gear drive pin 71 side to make the gear drive pin 71 engage with the second guide groove 73a when making the eccentric member 40 rotate from the low compression ratio position toward the high compression ratio position. Due to this, the gear drive pin 71 can be made to reliably engage with the first guide groove 72a and the second guide groove 73a and change the mechanical compression ratio.

Second Embodiment

Next, a second embodiment of the present disclosure will be explained. The embodiment differs from the first embodiment in the configuration of the switching rail drive device 74. Below, this will be explained focusing on the point of difference.

Figure 13:
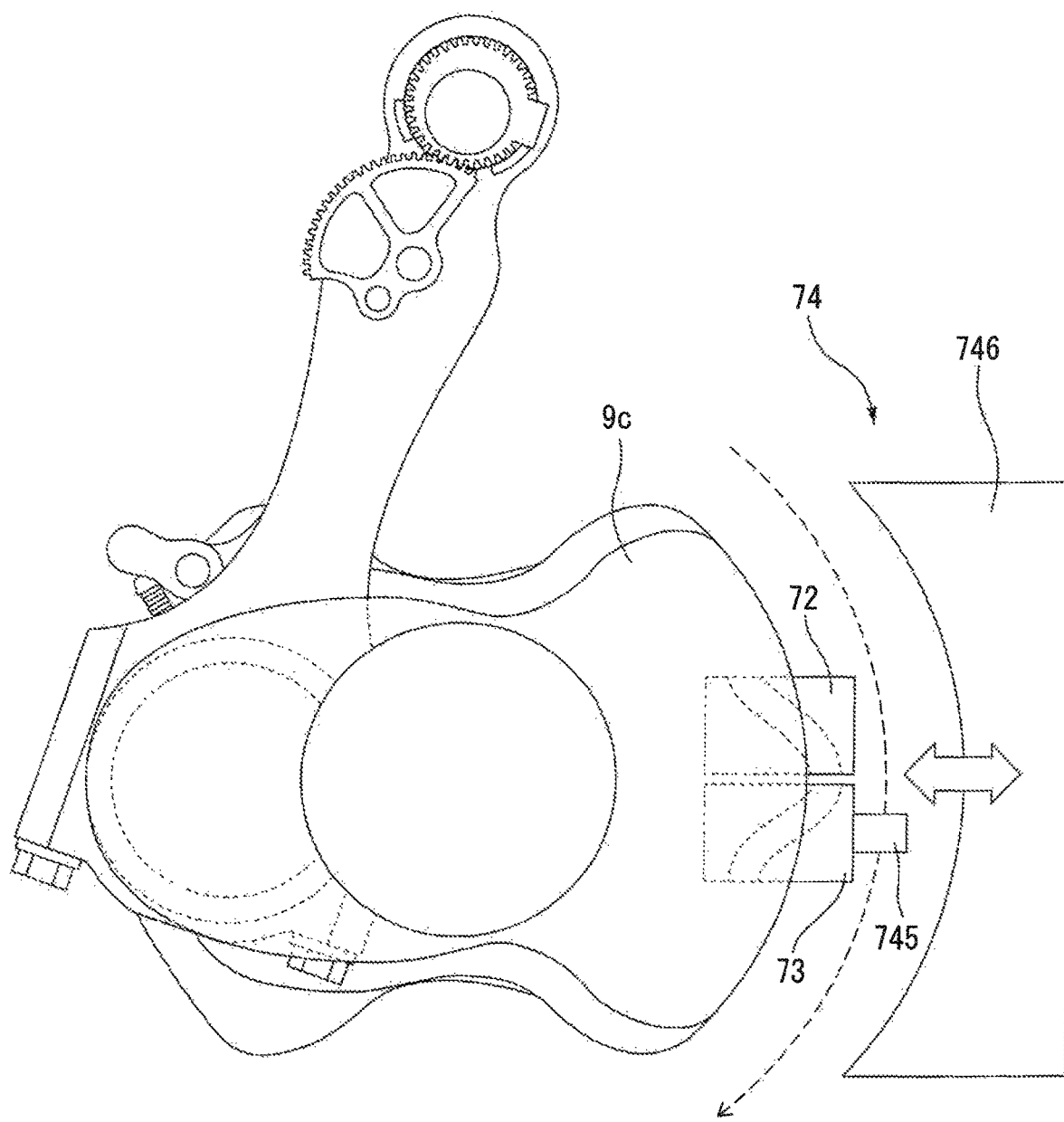
FIG. 13 is a view explaining a switching rail drive device according to a second embodiment of the present disclosure.

FIG. 13 is a view explaining the switching rail drive device 74 according to the present embodiment.

Figure 18:
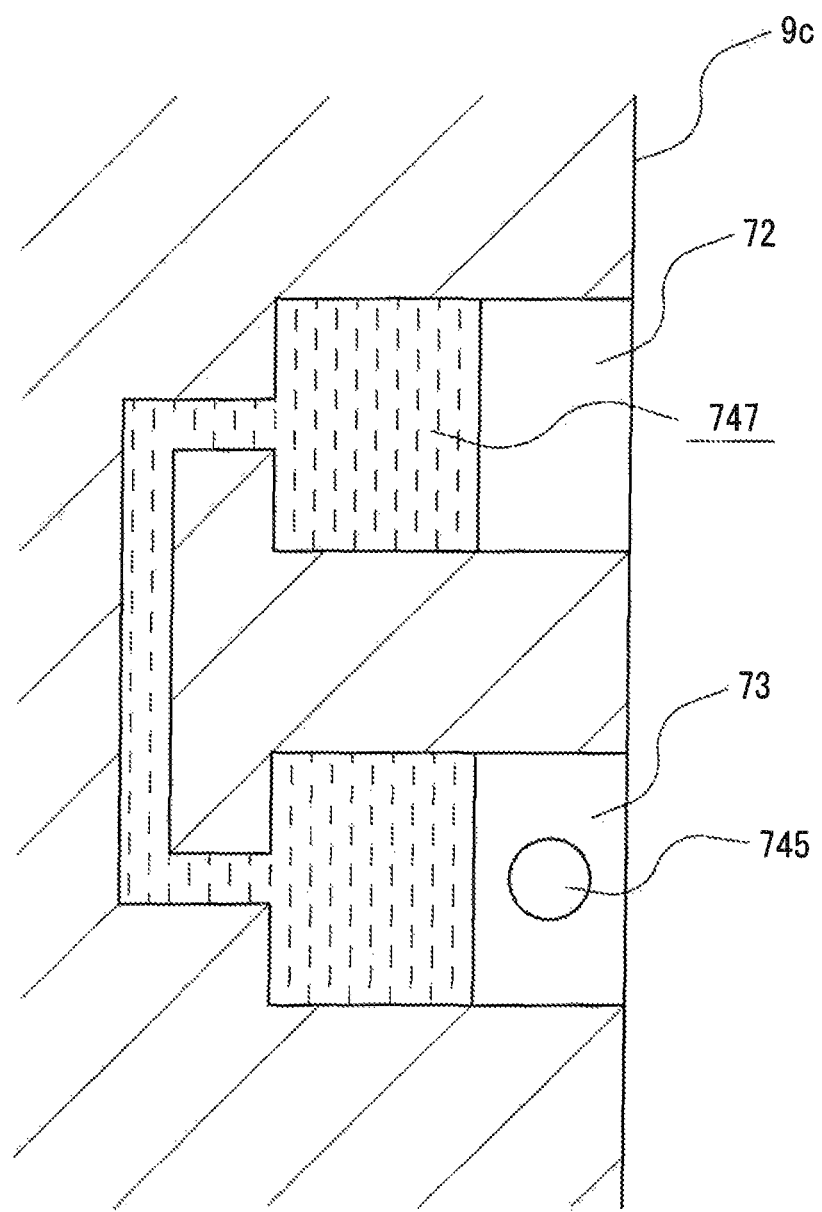
FIG. 18 is a view showing a closed oil passage formed at the inside of the counterweight.

They switching rail drive device 74 according to the present embodiment is provided with a rail drive pin 745 provided at the second switching rail 73, a slide member 746 attached to the cylinder block 2, and a closed oil passage 747 formed at the inside of the counterweight 9c (see FIG. 18).

The rail drive pin 745 is a columnar projection sticking out from the top surface of the second switching rail 73. The broken line arrow shown in FIG. 13 shows the path of the rail drive pin 745 during operation of the internal combustion engine 1. Note that in the present embodiment, the rail drive pin 745 is provided at the second switching rail 73, but it may also be provided at the first switching rail 72.

The slide member 746 is attached to, for example, the cylinder block 2 so as to face the counterweight 9c of the crankshaft 9. The slide member 746 is designed to be able to move toward the counterweight 9c side in the connecting rod width direction and further to be able to move in the connecting rod thickness direction.

Figure 14:
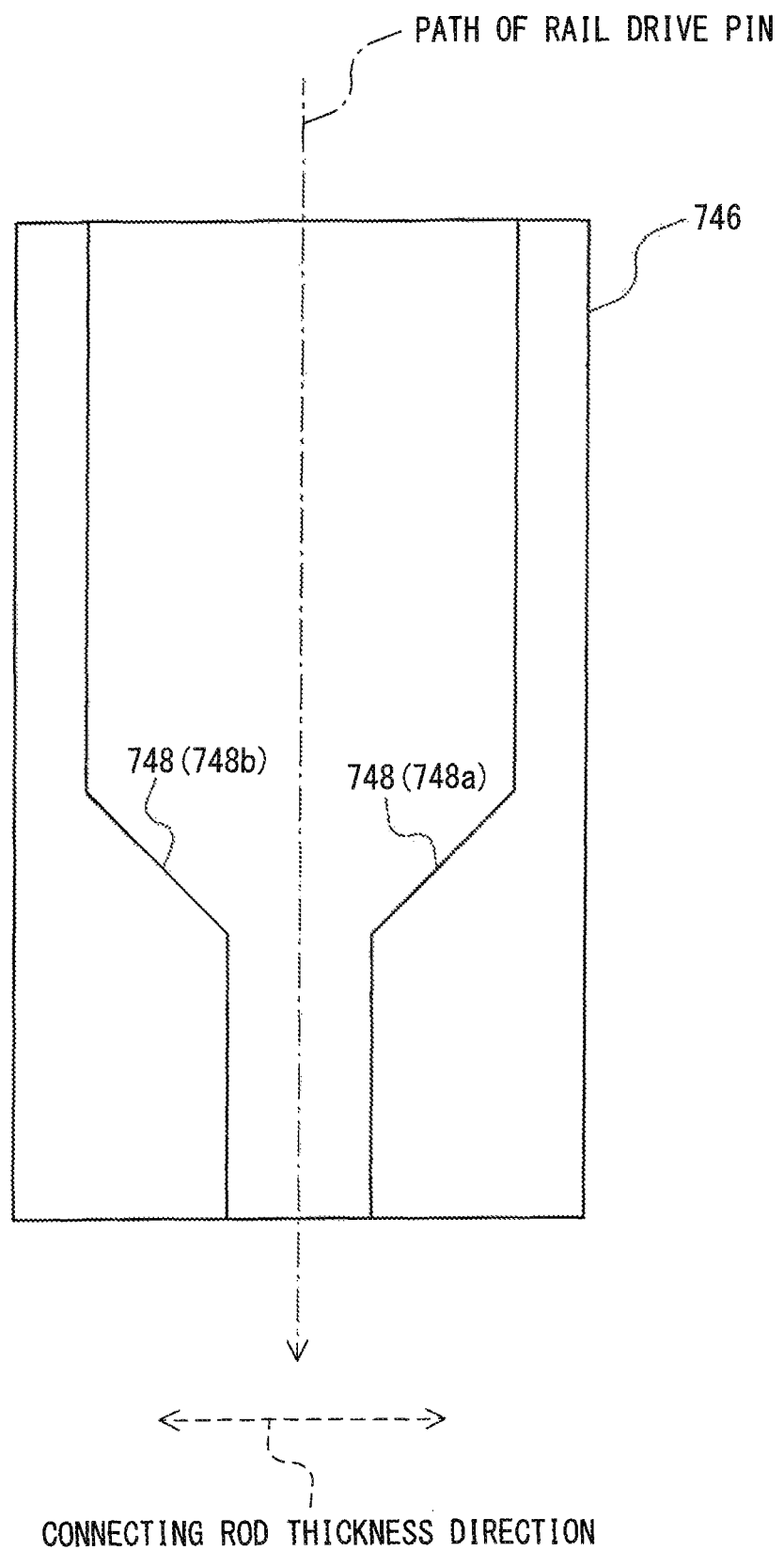
FIG. 14 is a plan view of a slide member seen from a counterweight side.

FIG. 14 is a plan view of the slide member 746 seen from the counterweight 9c side.

As shown in FIG. 14, the surface of the slide member 746 facing the counterweight 9c is formed with a rail guide groove 748 engaging with the rail drive pin 745 when making the slide member 746 move toward the counterweight 9c side in the connecting rod width direction.

The rail guide groove 748 is provided with a first slanted part 747a abutting against the rail drive pin 745 to make the second switching rail 73 move to the connecting rod side when making the slide member 746 move to the left and right in the connecting rod thickness direction and a second slanted part 747b making the second switching rail 73 move in a direction away from the connecting rod.

At the time of the initial state where the slide member 746 is not made to move to the left and right in the connecting rod thickness direction, as shown in FIG. 14 by the one-dot chain line, even if making the slide member 746 move toward the counterweight 9c side in the connecting rod width direction, the rail drive pin 745 does not abut against the first slanted part 747a and the second slanted part 747b.

Figure 15:
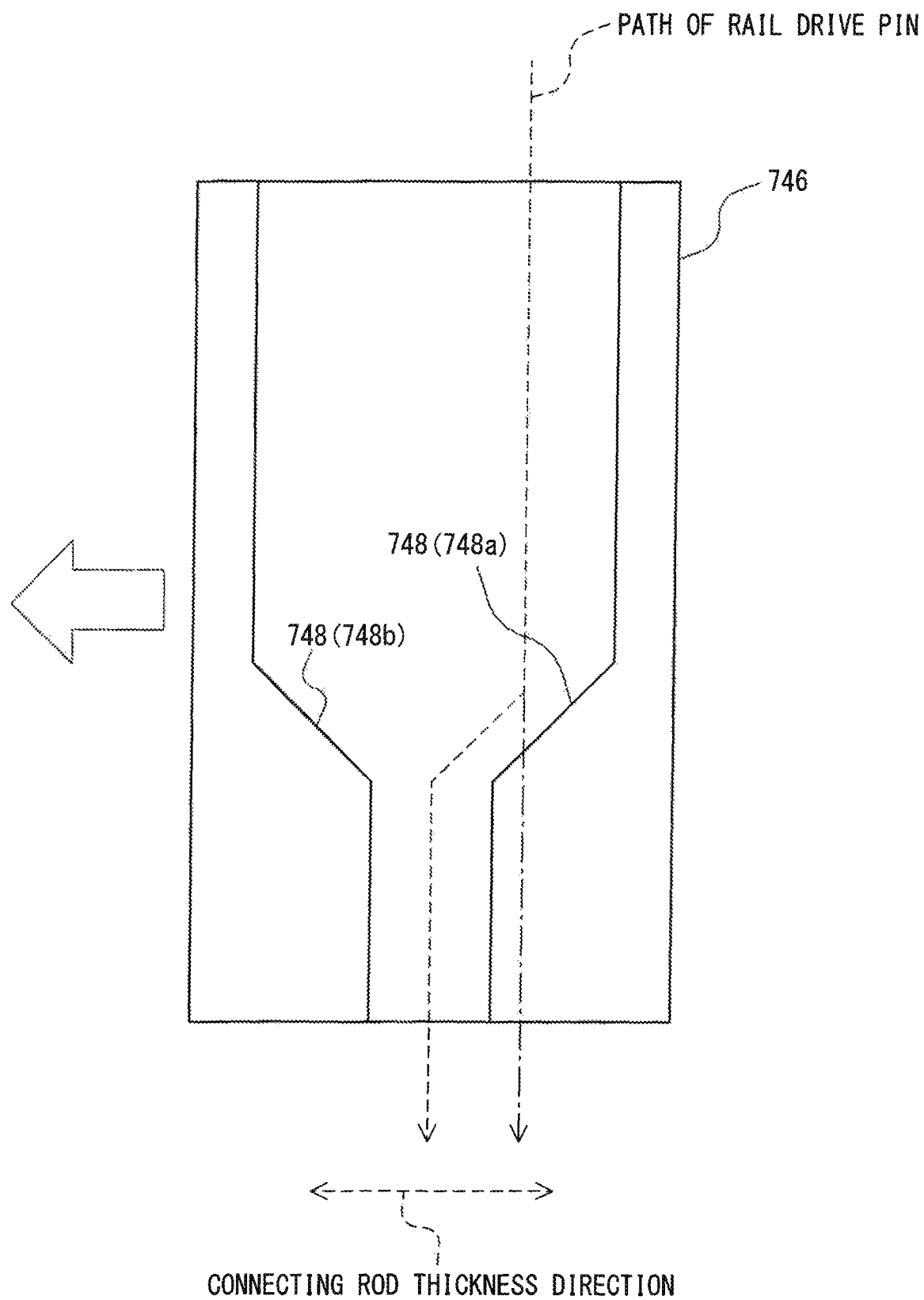
FIG. 15 is a view showing a state of making the slide member move from an initial state to make a second switching rail move to a connecting rod side.

FIG. 15 is a view showing the state when making the slide member 746 move from the initial state to one side in the connecting rod thickness direction to make the second switching rail 73 move to the connecting rod side.

As shown by the broken line in FIG. 15, by making the slide member 746 move from the initial state to the left side of the connecting rod thickness direction in the figure in the state making the slide member 746 move in the connecting rod width direction, it is possible to make the rail drive pin 745 abut against the first slanted part 747a to make the second switching rail move to the connecting rod side. Note that the arrow mark shown by the one-dot chain line in FIG. 15 is the path of the rail drive pin 745 shown in FIG. 14.

Figure 16:
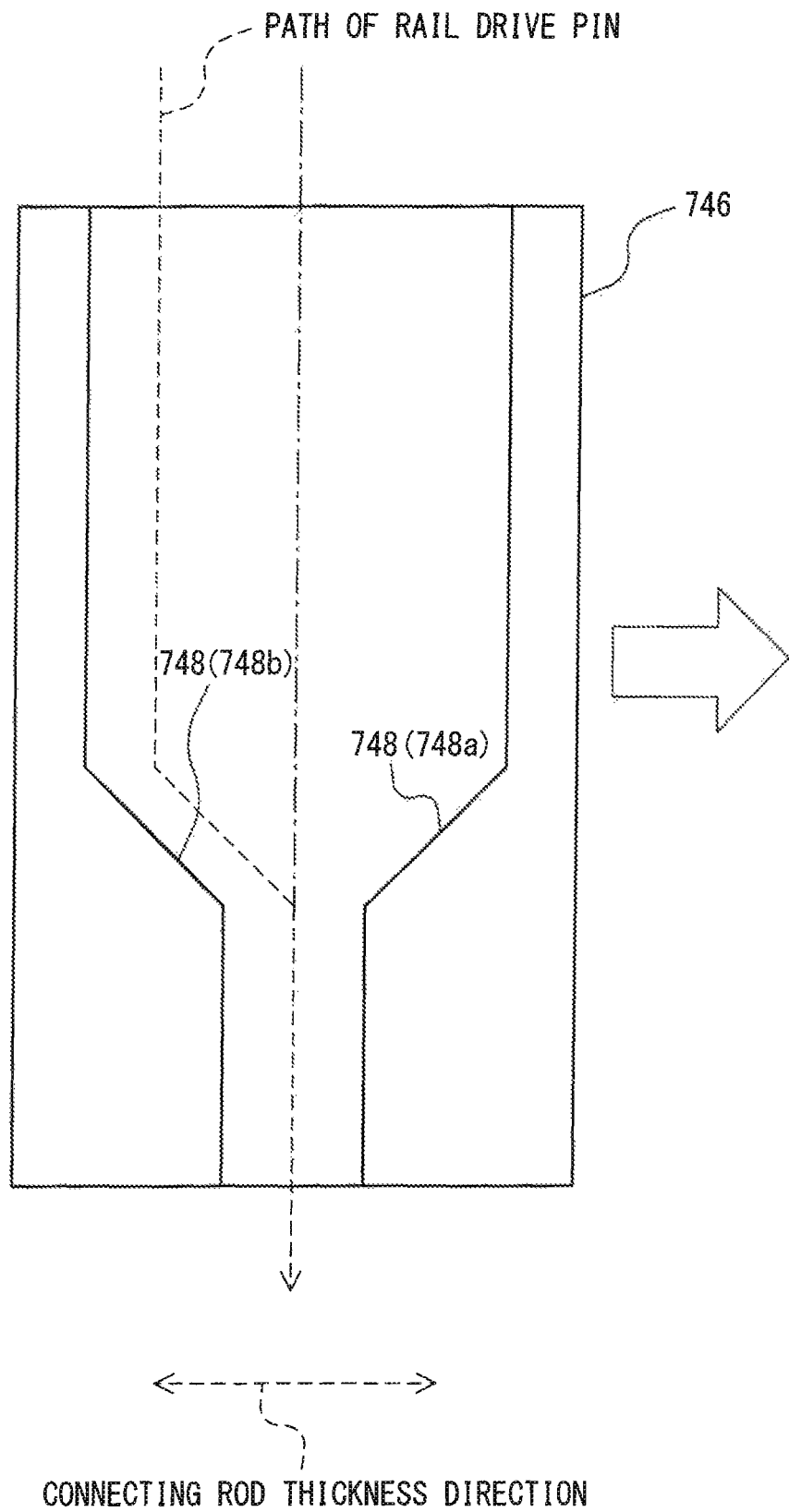
FIG. 16 is a view showing a state of making the slide member move from the state shown in FIG. 15 to make the second switching rail move in a direction away from the connecting rod to return to the initial state.

FIG. 16 is a view showing the state when making the slide member 746 move from the state shown in FIG. 15 to the other side in the connecting rod thickness direction and making the second switching rail 73 move in a direction away from the connecting rod 30 to return to the initial state.

As shown in FIG. 16 by the broken line, by making the slide member 746 move from the state shown in FIG. 15 to the right side in the connecting rod thickness direction in the figure, the rail drive pin 745 can be made to abut against the second slanted part 747b to make the second switching rail move in a direction away from the connecting rod 30 and return to the initial state shown in FIG. 14. Note that the arrow mark shown by the one-dot chain line in FIG. 16 is the path of the rail drive pin 745 shown in FIG. 14.

Figure 17:
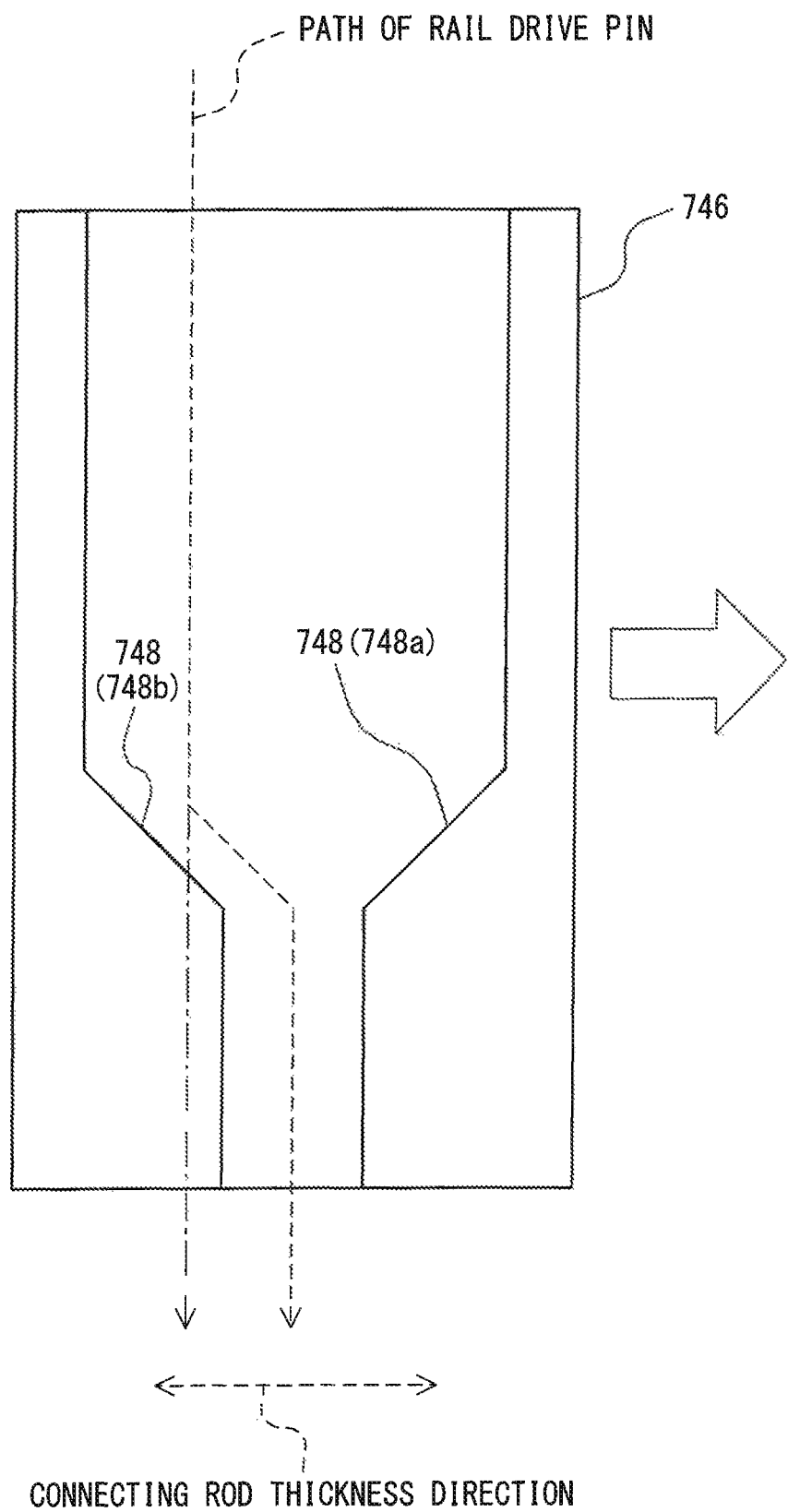
FIG. 17 is a view showing a state of making the slide member move from the initial state to make the second switching rail move in a direction away from the connecting rod 30.

FIG. 17 is a view showing the state of making the slide member 746 move from the initial state to the other side in the connecting rod thickness direction to make the second switching rail 73 move in a direction away from the connecting rod 30.

As shown in FIG. 17 by the broken line, by making the slide member 746 move from the initial state shown in FIG. 14 to the right side in the connecting rod thickness direction in the figure, it is possible to make the rail drive pin 745 abut against the second slanted part 747b to make the second switching rail move in a direction away from the connecting rod 30. Note that the arrow mark shown by the one-dot chain line in FIG. 17 is the path of the rail drive pin 745 shown in FIG. 14.

FIG. 18 is a view showing a closed oil passage 747 formed inside of the counterweight 9c.

As shown in FIG. 18, the closed oil passage 747 is an oil passage connecting a back side of the first switching rail 72 (side where first guide groove 72a is not formed) and a back side of the second switching rail 73 (side where second guide groove 73a is not formed) inside of the counterweight 9c. The closed oil passage 747 is closed by the first switching rail 72 and the second switching rail 73 and is filled inside it with hydraulic fluid.

Figure 19:
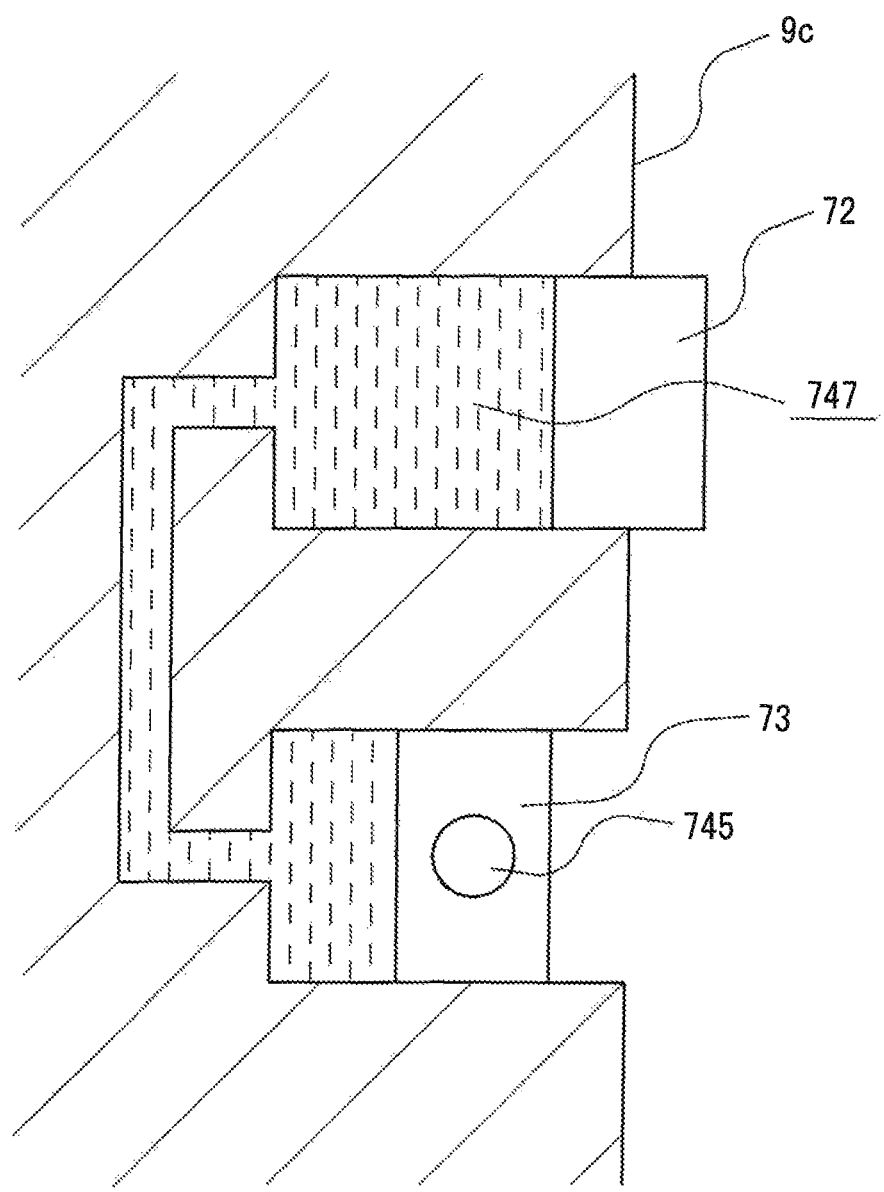
FIG. 19 is a view showing a state of the closed oil passage when making the second switching rail move from the state shown in FIG. 18 in a direction away from the connecting rod.

Due to this, as shown in FIG. 19, by making the second switching rail 73 move from the state shown in FIG. 18 (corresponding to initial state shown in FIG. 14) in a direction away from the connecting rod 30, the first switching rail 72 is made to move by oil pressure to the connecting rod 30 side and the first guide groove 72a of the first switching rail 72 and the gear drive pin 71 of the segment gear 50 can be made to engage.

Further, if making the second switching rail 73 move from the state shown in FIG. 19 in a direction away from the connecting rod 30, it is possible to return to the state shown in FIG. 18.

Figure 20:
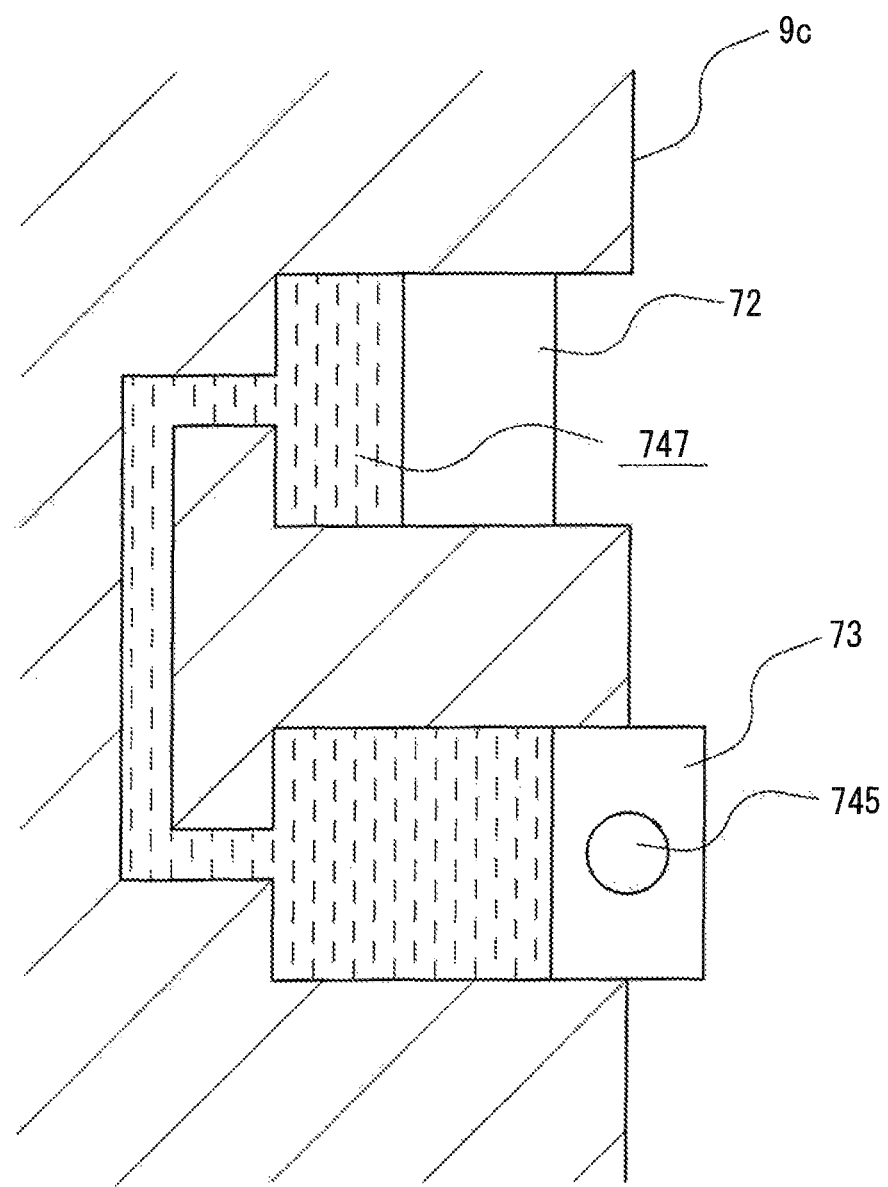
FIG. 20 is a view showing a state of the closed oil passage when making the second switching rail move from the state shown in FIG. 18 to the connecting rod side.

Further, as shown in FIG. 20, if making the second switching rail 73 move from the state shown in FIG. 18 to the connecting rod 30 side, the second guide groove 73a of the second switching rail 73 and the gear drive pin 71 of the segment gear 50 can be made the engaged state.

In this way, the switching rail drive device 74 (movable member drive device) according to the present embodiment is provided with a sealed closed oil passage 747 formed inside the counterweight 9c and connecting the opposite side of the side of the first switching rail 72 (first movable member) facing the gear drive pin 71 and the opposite side of the second switching rail 73 (second movable member) facing the gear drive pin 71 and is configured so that the second switching rail 73 moves to the opposite side of the gear drive pin 71 when making the first switching rail 72 move to the gear drive bin 71 by the oil pressure inside the closed oil passage 747 and so that the first switching rail 72 moves to the opposite side of the gear drive pin 71 when making the second switching rail 73 move to the gear drive pin 71 side. Even if configuring the switching rail drive device 74 in this way, it is possible to obtain similar effects to the first embodiment.

Above, embodiments of the present disclosure were explained, but the embodiments only show some of the examples of application of the present disclosure. The technical scope of the present disclosure is not limited to the specific constitutions of the embodiments.

The invention claimed is:

1. A variable compression ratio mechanism for changing a mechanical compression ratio of an internal combustion engine by changing a connecting rod length in a span from a center axis of a piston pin to a center axis of a crank pin of a crankshaft, the variable compression ratio mechanism comprising:

a connecting rod provided with a first shaft receiving hole formed at a small end and a second shaft receiving hole formed at a big end and supporting a crank pin;

an eccentric member inserted in the first shaft receiving hole to be able to rotate and supporting the piston pin so that an axial center of the piston pin is positioned at a position offset from a center axis of the first shaft receiving hole by exactly a predetermined amount;

stoppers provided at the small end, abutting against the eccentric member to restrict a rotational angle of the eccentric member, and making the eccentric member stop at a low compression ratio position where a connecting rod length becomes shorter and a high compression ratio position where the connecting rod length becomes longer;

a first gear provided at the eccentric member and rotating together with the eccentric member, a second gear attached to the connecting rod to be able to rotate for engaging with the first gear to make the first gear rotate; and a gear drive mechanism for making the second gear rotate to make the eccentric member rotate, wherein the gear drive mechanism comprises:

a gear drive pin provided at the second gear;

a first movable member and second movable member housed in a counterweight of the crankshaft and configured to be able to move to the gear drive pin side when making the eccentric member turn;

a first guide groove formed at a surface of the first movable member facing the gear drive pin and engaging with the gear drive pin when making the eccentric member turn from the high compression ratio position toward the low compression ratio position; and a second guide groove formed at a surface of the second movable member facing the gear drive pin and engaging with the gear drive pin when making the eccentric member turn from the low compression ratio position toward the high compression ratio position, and the gear drive mechanism is configured to make the gear drive pin moving relatively to the counterweight move along the first guide groove and the second guide groove to make the second gear rotate.

2. The variable compression ratio mechanism according to claim 1, wherein the first guide groove and the second guide groove are made groove shapes making the second gear rotate so that a speed of turn of the eccentric member after making the eccentric member turn by a predetermined angle becomes lower than a speed of turn of the eccentric member before making the eccentric member turn by a predetermined angle.

3. The variable compression ratio mechanism according to claim 1, wherein the gear drive mechanism is provided with a movable member drive device for making the first movable member move to the gear drive pin side to make the gear drive pin engage with the first guide groove when making the eccentric member rotate from the high compression ratio position toward the low compression ratio position and for making the second movable member move to the gear drive pin side to make the gear drive pin engage with the second guide groove when making the eccentric member rotate from the low compression ratio position toward the high compression ratio position.

4. The variable compression ratio mechanism according to claim 3, wherein the movable member drive device is provided with a closed oil passage formed inside the counterweight and connecting a surface of the first movable member opposite to the surface facing the gear drive pin and a surface of the second movable member opposite to the surface facing the gear drive pin, and the movable member drive device is configured so that the second movable member moves to the opposite side from the gear drive pin when making the first movable member move to the gear drive pin side by the oil pressure inside the oil passage and the first movable member moves to the opposite side from the gear drive pin when making the second movable member move to the gear drive pin side by the oil pressure inside the oil passage.

* * * * *